(12) United States Patent
Damera-Venkata et al.

(10) Patent No.: US 7,742,011 B2
(45) Date of Patent: Jun. 22, 2010

(54) IMAGE DISPLAY SYSTEM

(75) Inventors: Niranjan Damera-Venkata, Palo Alto, CA (US); Nelson Liang An Chang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 770 days.

(21) Appl. No.: 11/590,173

(22) Filed: Oct. 31, 2006

(65) Prior Publication Data

US 2008/0143978 A1    Jun. 19, 2008

(51) Int. Cl.
*G09G 5/00*    (2006.01)

(52) U.S. Cl. .............................. 345/1.3; 345/9; 345/1.2; 345/204

(58) Field of Classification Search .................. 345/1.3, 345/9, 87, 89, 690, 42, 1.2, 30–33, 204; 353/30, 353/31, 94, 69, 99, 121; 359/443, 245, 618, 359/569; 380/200, 203; 382/156, 169, 286, 382/236, 254; 348/254, 187, 744
See application file for complete search history.

(56) References Cited

U.S. PATENT DOCUMENTS

| | | | |
|---|---|---|---|
| 4,373,784 A | | 2/1983 | Nonomura et al. |
| 4,662,746 A | | 5/1987 | Hornbeck |
| 4,811,003 A | | 3/1989 | Strathman et al. |
| 4,956,619 A | | 9/1990 | Hornbeck |
| 5,061,049 A | | 10/1991 | Hornbeck |
| 5,083,857 A | | 1/1992 | Hornbeck |
| 5,146,356 A | | 9/1992 | Carlson |
| 5,289,297 A | * | 2/1994 | Bollman et al. ............. 358/537 |
| 5,309,241 A | | 5/1994 | Hoagland |
| 5,317,409 A | | 5/1994 | Macocs |
| 5,386,253 A | | 1/1995 | Fielding |
| 5,402,184 A | | 3/1995 | O'Grady et al. |
| 5,490,009 A | | 2/1996 | Venkateswar et al. |
| 5,557,353 A | | 9/1996 | Stahl |
| 5,689,283 A | | 11/1997 | Shirochi |
| 5,724,058 A | * | 3/1998 | Choi et al. .................... 345/89 |
| 5,748,773 A | * | 5/1998 | Tashiro et al. ............... 382/169 |

(Continued)

FOREIGN PATENT DOCUMENTS

EP    1001306 A2    5/2000

(Continued)

OTHER PUBLICATIONS

C. Jaynes et al., Super-Resolution Composition in Multi-Projector Display's IEEE Int'l Workshop on Projector-Camera Systems, Oct. 2003; 8 pgs.

(Continued)

*Primary Examiner*—Prabodh Dharia

(57) ABSTRACT

A projection system for displaying an arbitrary combination of superimposed and tiled images using a plurality of projectors. A sub-frame generator generates a plurality of sub-frames corresponding to an image frame for simultaneous display by the projectors in at least partially overlapping positions on a display surface. The sub-frames are generated using optimal sub-pixel blending maps that are derived by forming a simulated image to approximate a target image subject to at least one smoothing constraint between the simulated image and the target image. The target image is formed from the image frame using at least one property (e.g., luminance or color) of each of the plurality of projectors.

19 Claims, 9 Drawing Sheets

U.S. PATENT DOCUMENTS

| | | | |
|---|---|---|---|
| 5,751,379 A | | 5/1998 | Markandey et al. |
| 5,751,844 A | * | 5/1998 | Bolin et al. ................. 382/156 |
| 5,842,762 A | | 12/1998 | Clarke |
| 5,847,784 A | | 12/1998 | Finnila et al. |
| 5,897,191 A | | 4/1999 | Clarke |
| 5,912,773 A | | 6/1999 | Barnett et al. |
| 5,920,365 A | | 7/1999 | Eriksson |
| 5,953,148 A | | 9/1999 | Moseley et al. |
| 5,978,518 A | | 11/1999 | Oliyide et al. |
| 6,025,951 A | | 2/2000 | Swart et al. |
| 6,067,143 A | | 5/2000 | Tomita |
| 6,104,375 A | | 8/2000 | Lam |
| 6,115,022 A | | 9/2000 | Mayer, III et al. |
| 6,118,584 A | | 9/2000 | Van Berkel et al. |
| 6,141,039 A | | 10/2000 | Poetsch |
| 6,184,969 B1 | | 2/2001 | Fergason |
| 6,219,017 B1 | | 4/2001 | Shimada et al. |
| 6,219,099 B1 | | 4/2001 | Johnson et al. |
| 6,239,783 B1 | | 5/2001 | Hill et al. |
| 6,243,055 B1 | | 6/2001 | Fergason |
| 6,310,650 B1 | | 10/2001 | Johnson et al. |
| 6,313,888 B1 | | 11/2001 | Tabata |
| 6,317,171 B1 | | 11/2001 | Dewald |
| 6,384,816 B1 | | 5/2002 | Tabata |
| 6,390,050 B2 | | 5/2002 | Feikus |
| 6,393,145 B2 | | 5/2002 | Betrisey et al. |
| 6,456,339 B1 | | 9/2002 | Surati et al. |
| 6,522,356 B1 | | 2/2003 | Watanabe |
| 6,525,772 B2 | | 2/2003 | Johnson et al. |
| 6,657,603 B1 | | 12/2003 | Demetrescu et al. |
| 6,984,040 B2 | * | 1/2006 | Childers ...................... 353/30 |
| 7,147,331 B2 | * | 12/2006 | Yamazaki et al. ............. 353/31 |
| 7,387,392 B2 | * | 6/2008 | Widdowson et al. .......... 353/94 |
| 2003/0020809 A1 | | 1/2003 | Gibbon et al. |
| 2003/0076325 A1 | | 4/2003 | Thrasher |
| 2003/0090447 A1 | * | 5/2003 | Kimura ....................... 345/82 |
| 2003/0090597 A1 | | 5/2003 | Katoh et al. |
| 2004/0041760 A1 | * | 3/2004 | Tsumura et al. ............... 345/87 |
| 2004/0233276 A1 | * | 11/2004 | Palovuori .................... 348/56 |
| 2004/0239885 A1 | | 12/2004 | Jaynes et al. |
| 2005/0157272 A1 | * | 7/2005 | Childers ...................... 353/84 |
| 2006/0209057 A1 | * | 9/2006 | Damera-Venkata et al. . 345/204 |
| 2006/0221304 A1 | * | 10/2006 | Damera-Venkata et al. ... 353/30 |
| 2007/0024824 A1 | * | 2/2007 | Damera-Venkata et al. ... 353/94 |
| 2007/0052695 A1 | * | 3/2007 | Barnes et al. ................ 345/204 |
| 2007/0052934 A1 | * | 3/2007 | Widdowson et al. .......... 353/94 |
| 2007/0091277 A1 | * | 4/2007 | Damera-Venkata et al. ... 353/69 |
| 2007/0097017 A1 | * | 5/2007 | Widdowson et al. ......... 345/1.3 |
| 2007/0097384 A1 | * | 5/2007 | Hashimoto et al. ............ 345/60 |
| 2007/0132965 A1 | * | 6/2007 | Damera-Venkata et al. ... 353/94 |
| 2007/0132967 A1 | * | 6/2007 | Damera-Venkata et al. . 353/121 |
| 2007/0133794 A1 | * | 6/2007 | Cloutier et al. ............. 380/200 |
| 2008/0002160 A1 | * | 1/2008 | Chang et al. .................. 353/94 |
| 2008/0024389 A1 | * | 1/2008 | O'Brien-Strain et al. ..... 345/1.2 |
| 2008/0024469 A1 | * | 1/2008 | Damera-Venkata et al. . 345/204 |
| 2008/0024683 A1 | * | 1/2008 | Damera-Venkata et al. . 348/744 |
| 2008/0043209 A1 | * | 2/2008 | Widdowson et al. .......... 353/94 |
| 2008/0095363 A1 | * | 4/2008 | DiCarto et al. .............. 380/203 |
| 2008/0101711 A1 | * | 5/2008 | Kalker et al. ................ 382/254 |
| 2008/0101725 A1 | * | 5/2008 | Lin et al. .................... 382/286 |

FOREIGN PATENT DOCUMENTS

WO     WO2004/040899     5/2004

OTHER PUBLICATIONS

L.M. Chen & S. Hasagawa, "Visual Resolution Limits for Color Matrix Displays—One Panel Projectors", vol. 13, pp. 221-226, 1992.

A. Yasuda et al., "FLC Wobbling for High-Resolution Projectors", Journal of the SID, May 1997, pp. 229-305.

T. Tokita et al., "P-108: FLC Resolution-Enhancing Device for Projection Displays", SID 02 Digest 2002, pp. 638-641.

D.K. Kelley, "Motion and Vision—II. Stabilized Spatio-Temporal Threshold Surface", Journal of the OPtical Society of America, vol. 69, No. 10, Oct. 1979.

Candice H. Brown Elliott et al., "Color Subpixel Rendering Projectors and Flat Panel Displays" SMPTE Advanced Motion Imaging Conference; Feb. 27-Mar. 1, 2003; pp. 1-4.

Diana C. Chen, "Display Resolution Enhancement with Optical Scanners", Applied Optics, vol. 40, No. 5, Feb. 10, 2001; pp. 636-643.

Ruigang Yang et al., "Automatic and Continuous Projector Display Surface Calibration Using Every-Day Imagery", Conf. on Compu. Graph., Czech Rep. 2001.

Akash Kushal et al., "A Handheld Projector supported by Computer Vision", U of Illinois, Dept. of Computer Science, Asian Conf. Comp. Vis., India, Jan. 2006.

Ramesh Raskar et al., "A Low-Cost Projector Mosaic with Fast Registration", Mitsuibishi Electric Research Laboratories, Conf. on Comp. Vis., Australia 2002.

Matt Steele et al., "Parametric Subpixel Matchpoint Recovery with Uncertainty Estimation: A Statistical Approach", IEEE Workshop, Jul. 2003.

Stefanie Zollmann et al., "Passive-Active Geometric Calibration for View-Dependent Projections onto Arbitrary Surfaces" Augumented Reality Workshop Sep. 2006.

* cited by examiner

IMAGE DISPLAY SYSTEM

CROSS-REFERENCE TO RELATED APPLICATIONS

This application is related to U.S. patent application Ser. No. 11/080,583, filed Mar. 15, 2005, and entitled PROJECTION OF OVERLAPPING SUB-FRAMES ONTO A SURFACE; U.S. patent application Ser. No. 11/080,223, filed Mar. 15, 2005, and entitled PROJECTION OF OVERLAPPING SINGLE-COLOR SUB-FRAMES ONTO A SURFACE; U.S. patent application Ser. No. 11/258,624, filed on Oct. 26, 2005, and entitled LUMINANCE BASED MULTIPLE PROJECTOR SYSTEM; and U.S. patent application Ser. No. 11/301,060, filed on Dec. 12, 2005, and entitled SYSTEM AND METHOD FOR DISPLAYING AN IMAGE, which is incorporated by reference. These applications are incorporated by reference herein.

BACKGROUND

Two types of projection display systems are digital light processor (DLP) systems, and liquid crystal display (LCD) systems. It is desirable in some projection applications to provide a high lumen level output, but it is very costly to provide such output levels in existing DLP and LCD projection systems. Three choices exist for applications where high lumen levels are desired: (1) high-output projectors; (2) tiled, low-output projectors; and (3) superimposed, low-output projectors.

When information requirements are modest, a single high-output projector is typically employed. This approach dominates digital cinema today, and the images typically have a nice appearance. High-output projectors have the lowest lumen value (i.e., lumens per dollar). The lumen value of high output projectors is less than half of that found in low-end projectors. If the high output projector fails, the screen goes black. Also, parts and service are available for high output projectors only via a specialized niche market.

Tiled projection can deliver very high resolution, but it is difficult to hide the seams separating tiles, and output is often reduced to produce uniform tiles. Tiled projection can deliver the most pixels of information. For applications where large pixel counts are desired, such as command and control, tiled projection is a common choice. Registration, color, and brightness must be carefully controlled in tiled projection. Matching color and brightness is accomplished by attenuating output, which costs lumens. If a single projector fails in a tiled projection system, the composite image is ruined.

Superimposed projection provides excellent fault tolerance and full brightness utilization, but resolution is typically compromised. Algorithms that seek to enhance resolution by offsetting multiple projection elements have been previously proposed. These methods assume simple shift offsets between projectors, use frequency domain analyses, and rely on heuristic methods to compute component sub-frames. The proposed systems do not generate optimal sub-frames in real-time, and do not take into account arbitrary relative geometric distortion between the component projectors.

Existing projection systems do not provide a cost effective solution for high lumen level (e.g., greater than about 10,000 lumens) applications. Existing projection systems also typically use a single resolution or scale for projected images, and for tiled projection, these systems typically use ad-hoc blending techniques. In addition, existing multi-projector systems do not typically produce images that accurately reproduce the color of the original image data.

Although existing projection systems support tiled or superimposed projection, these projection systems are typically not configured to optimize the display of an arbitrary combination of tiled and superimposed images.

SUMMARY

According to one embodiment, a method performed by an image display system is provided. The method includes accessing an image frame and generating first and second sub-frames from the image frame for simultaneous display by first and second display devices, respectively, in at least partially overlapping positions on a display surface so that a simulated image formed from the first and the second sub-frames approximates, subject to at least one smoothing constraint, a target image formed from the image frame and at least one property (e.g., luminance or color) of each of the first and the second display devices.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," etc., may be used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

As described herein, a system and method for displaying an arbitrary combination of superimposed and tiled images with multiple display devices is provided. The system and method contemplate the simultaneous display of sub-frames by the display devices to form a displayed image with a combination of superimposed and tiled images, as described below, on a display surface. The system and method generate the sub-frames using the pixel sizes and shapes of the display devices to allow for arbitrary scaling between an input image and the displayed image. The system and method generate the sub-frames such that a simulated image formed from the sub-frames approximates a target image for each input image to be displayed subject to smoothing constraints. The system and method determine a target image according to the luminance, color, and black offset characteristics of the display devices.

I. Image Display System

Figure 1:
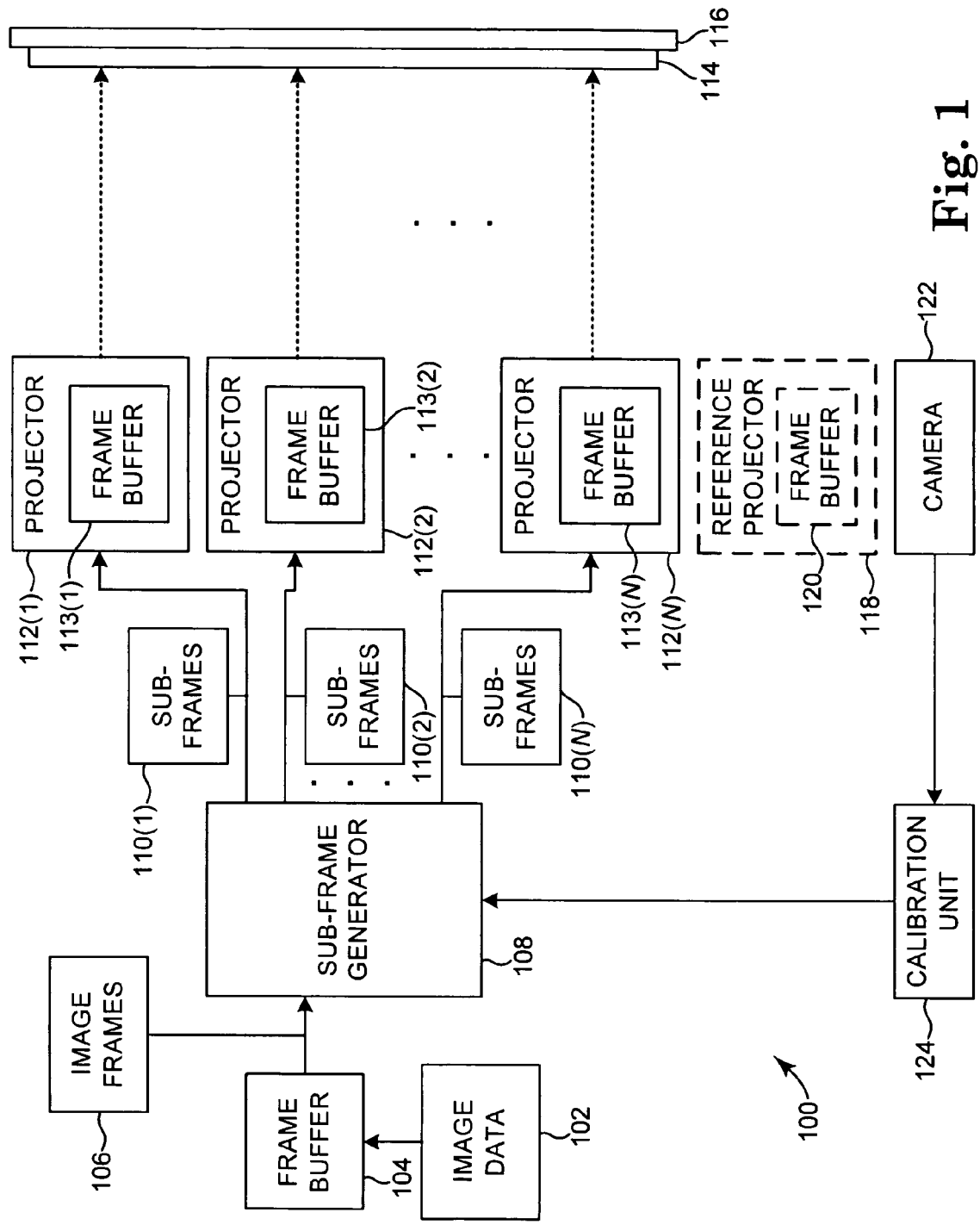
FIG. 1 is a block diagram illustrating one embodiment of an image display system.

FIG. 1 is a block diagram illustrating one embodiment of an image display system 100 configured to display an arbitrary combination of superimposed and tiled images with projectors 112. Image display system 100 includes an image frame buffer 104, a sub-frame generator 108, projectors 112(1)-112(N) where N is an integer greater than or equal to two (collectively referred to as projectors 112), one or more cameras 122, and calibration unit 124.

Image display system 100 processes image data 102 and generates a corresponding displayed image 114 on a display surface 116. In the embodiment of FIG. 1, image display system 100 generates displayed image 114 on display surface 116 such that displayed image 114 is formed by overlapping or at least partially overlapping images on display surface 116. Displayed image 114 includes any combination of tiled and superimposed images formed by projectors 112 where at least two of the images at least partially overlap on display surface 116. Displayed image 114 is defined to include any combination of pictorial, graphical, or textural characters, symbols, illustrations, or other representations of information. Displayed image 114 may form a still image that is displayed on display surface 116 or may be one of a set of successive images in a video stream that is displayed on display surface 116.

Image frame buffer 104 receives and buffers image data 102 to create image frames 106. Image data 102 may include one or more images for each image frame 106 that may be provided from one or more sources, and each image frame 106 may include one or more images from the one or more sources. Sub-frame generator 108 processes image frames 106 to define corresponding image sub-frames 110(1)-110(N) (collectively referred to as sub-frames 110). For each image frame 106, sub-frame generator 108 generates one sub-frame 110 for each projector 112 in one embodiment. Sub-frames 110-110(N) are received by projectors 112-112(N), respectively, and stored in image frame buffers 113-113(N) (collectively referred to as image frame buffers 113), respectively. Projectors 112(1)-112(N) project the sub-frames 110(1)-110(N), respectively, onto display surface 116 to produce displayed image 114 for viewing by a user. At least a portion of sub-frames 110(1)-110(N) are displayed in at least partially overlapping and spatially offset positions to form at least one superimposed and/or tiled image.

In one embodiment, image display system 100 attempts to determine appropriate values for the sub-frames 110 so that displayed image 114 produced by the projected sub-frames 110 is close in appearance to how a corresponding high-resolution image (e.g., a corresponding image frame 106) from which the sub-frame or sub-frames 110 were derived would appear if displayed directly.

Also shown in FIG. 1 is reference projector 118 with an image frame buffer 120. Reference projector 118 is shown with dashed lines in FIG. 1 because, in one embodiment, projector 118 is not an actual projector but rather a hypothetical high-resolution reference projector that is used in an image formation model for generating optimal sub-frames 110, as described in additional detail below. Reference projector 118 forms a reference coordinate system. In one embodiment, the location of one of the actual projectors 112 is defined to be the location of the reference projector 118. In another embodiment, reference projector 118 corresponds to the physical location of display surface 116. In yet another embodiment, reference projector 118 is defined to be the same as the coordinate system of camera 122.

Display system 100 includes at least one camera 122 and calibration unit 124, which are used to automatically determine a geometric mapping between each projector 112 and the reference projector 118, as described in additional detail below.

In one embodiment, sub-frame generator 108 generates image sub-frames 110 with a resolution that matches the resolution of projectors 112, which is less than the resolution of image frames 106 in one embodiment. Sub-frames 110 each include a plurality of columns and a plurality of rows of individual pixels representing a subset of an image frame 106.

In one embodiment, display system 100 is configured to give the appearance to the human eye of high-resolution displayed images 114 by displaying overlapping and spatially shifted lower-resolution sub-frames 110. The projection of overlapping and spatially shifted sub-frames 110 may give the appearance of enhanced resolution (i e., higher resolution than the sub-frames 110 themselves).

Sub-frames 110 projected onto display surface 116 may have perspective distortions, and the pixels may not appear as perfect squares with no variation in the offsets and overlaps from pixel to pixel, such as that shown in FIGS. 2A-2D. Rather, the pixels of sub-frames 110 may take the form of distorted quadrilaterals or some other shape, and the overlaps may vary as a function of position. Thus, terms such as "spatially shifted" and "spatially offset positions" as used herein are not limited to a particular pixel shape or fixed offsets and overlaps from pixel to pixel, but rather are intended to include any arbitrary pixel shape, and offsets and overlaps that may vary from pixel to pixel.

FIGS. 2A-2D are schematic diagrams illustrating the projection of four sub-frames 110(1), 110(2), 110(3), and 110(4) in at least partially overlapping positions. In this embodiment, projection system 100 includes at least four projectors 112, and sub-frame generator 108 generates at least a set of four sub-frames 110(1), 110(2), 110(3), and 110(4) for each image frame 106 for display by projectors 112. As such, sub-frames 110(1), 110(2), 110(3), and 110(4) each include a plurality of columns and a plurality of rows of individual pixels 202 of image data.

Figure 2A:
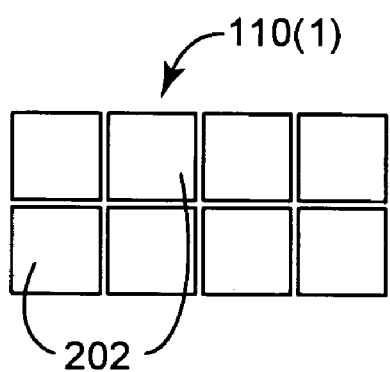
FIGS. 2A-2D are schematic diagrams illustrating one embodiment of the projection of four sub-frames.
Figure 2B:
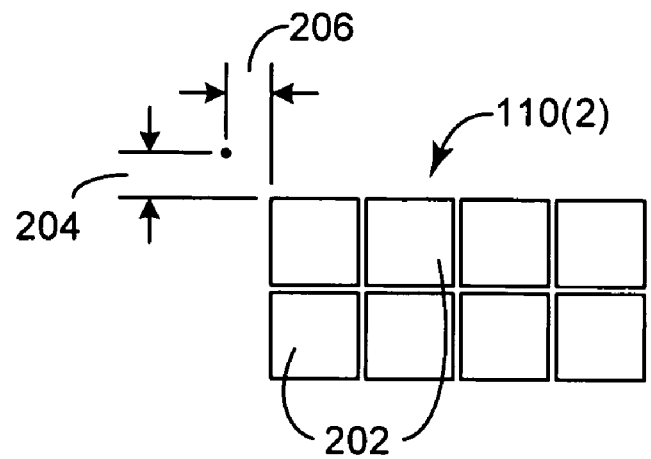
Figure 2C:
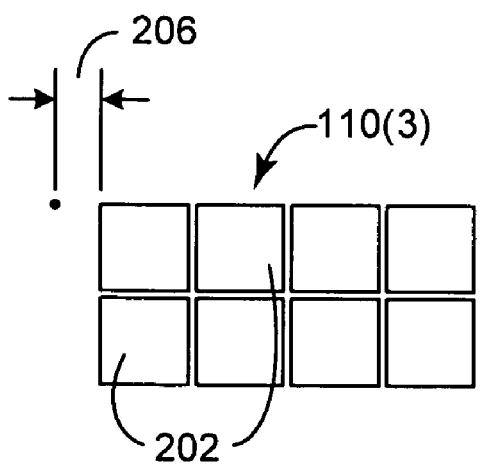
Figure 2D:
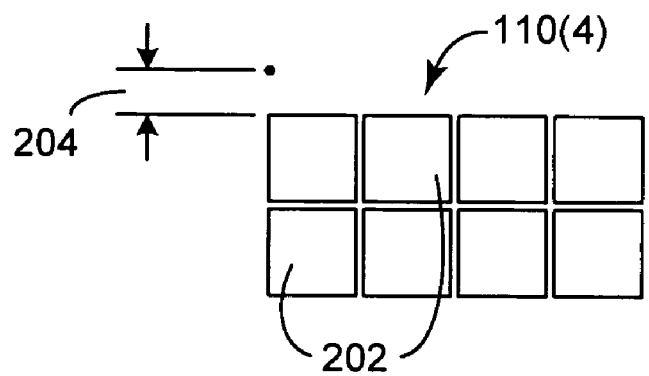

FIG. 2A illustrates the display of sub-frame 110(1) by a first projector 112(1). As illustrated in FIG. 2B, a second projector 112(2) displays sub-frame 110(2) offset from sub-frame 110(1) by a vertical distance 204 and a horizontal distance 206. As illustrated in FIG. 2C, a third projector 112(3) displays sub-frame 110(3) offset from sub-frame 110(1) by horizontal distance 206. A fourth projector 112(4) displays sub-frame 110(4) offset from sub-frame 110(1) by vertical distance 204 as illustrated in FIG. 2D.

Sub-frame 110(1) is spatially offset from sub-frame 110(2) by a predetermined distance. Similarly, sub-frame 110(3) is spatially offset from sub-frame 110(4) by a predetermined distance. In one illustrative embodiment, vertical distance 204 and horizontal distance 206 are each approximately one-half of one pixel.

The display of sub-frames 110(2), 110(3), and 110(4) are spatially shifted relative to the display of sub-frame 110(1) by vertical distance 204, horizontal distance 206, or a combination of vertical distance 204 and horizontal distance 206. As such, pixels 202 of sub-frames 110(1), 110(2), 110(3), and 110(4) at least partially overlap thereby producing the appearance of higher resolution pixels. Sub-frames 110(1), 110(2), 110(3), and 110(4) may be superimposed on one another (i.e., fully or substantially fully overlap), may be tiled (i.e., partially overlap at or near the edges), or may be a combination of superimposed and tiled. The overlapped sub-frames 110(1), 110(2), 110(3), and 110(4) also produce a brighter overall image than any of sub-frames 110(1), 110(2), 110(3), or 110(4) alone.

Image display system 100 includes hardware, software, firmware, or a combination of these. In one embodiment, one or more components of image display system 100 are included in a computer, computer server, or other microprocessor-based system capable of performing a sequence of logic operations. In addition, processing can be distributed throughout the system with individual portions being implemented in separate system components, such as in a networked or multiple computing unit environments.

Sub-frame generator 108 and calibration unit 124 may be implemented in hardware, software, firmware, or any combination thereof and may be combined into one or more processing systems. Each processing system may have any suitable combination of central processing units (CPUs) and graphical processing units (GPUs). For example, sub-frame generator 108 and calibration unit 124 may include a microprocessor, programmable logic device, or state machine. Sub-frame generator 108 and calibration unit 124 may also include software stored on one or more computer-readable mediums and executable by a processing system (not shown). The term computer-readable medium as used herein is defined to include any kind of memory, volatile or non-volatile, such as floppy disks, hard disks, CD-ROMs, flash memory, read-only memory, and random access memory.

Image frame buffer 104 includes memory for storing image data 102 for image frames 106. Thus, image frame buffer 104 constitutes a database of image frames 106. Image frame buffers 113 also include memory for storing any number of sub-frames 110. Examples of image frame buffers 104 and 113 include non-volatile memory (e.g., a hard disk drive or other persistent storage device) and may include volatile memory (e.g., random access memory (RAM)).

Display surface 116 may be planar, non-planar, curved, or have any other suitable shape. In one embodiment, display surface 116 reflects the light projected by projectors 112 to form displayed image 114. In another embodiment, display surface 116 is translucent, and display system 100 is configured as a rear projection system.

In other embodiments, other numbers of projectors 112 are used in system 100 and other numbers of sub-frames 110 are generated for each image frame 106.

In other embodiments, sub-frames 110(1), 110(2), 110(3), and 110(4) may be displayed at other spatial offsets relative to one another and the spatial offsets may vary over time.

In one embodiment, sub-frames 110 have a lower resolution than image frames 106. Thus, sub-frames 110 are also referred to herein as low-resolution images or sub-frames 110, and image frames 106 are also referred to herein as high-resolution images or frames 106. The terms low resolution and high resolution are used herein in a comparative fashion, and are not limited to any particular minimum or maximum number of pixels.

In one embodiment, display system 100 produces at least a partially superimposed projected output that takes advantage of natural pixel mis-registration to provide a displayed image with a higher resolution than the individual sub-frames 110. In one embodiment, image formation due to multiple overlapped projectors 112 is modeled using a signal processing model. Optimal sub-frames 110 for each of the component projectors 112 are estimated by sub-frame generator 108 based on the model, such that the resulting image predicted by the signal processing model is as close as possible to the desired high-resolution image to be projected. In one embodiment described in additional detail below, the signal processing model is used to generate values for sub-frames 110 that minimize visual color artifacts that can occur due to offset projection of sub-frames 110.

In other embodiments, one or more of projectors 112 is replaced with one or more other types of display devices configured to display sub-frames 110 onto display surface 116. A display device may be a CRT display, an LCD display, or a DMD display, for example, that are configured to display sub-frames 110 onto or in display surface 116.

In the above embodiments, any suitable pre-processing of image frames 106 may be performed by image display system 100 prior to generating sub-frames 110. For example, image display system 100 may perform gamma uncorrection on each image frame 106 to convert each image frame 106 into a linear color space. In addition, any suitable post-processing of sub-frames 110 may be performed by image display system 100. For example, display system 100 may perform gamma correction and/or dithering on sub-frames 110 prior to providing sub-frames 110 to projectors 112.

II. Generation of Optimal Sub-Frames

Image display system 100 is configured to generate sub-frames 110 to form displayed image 114 with any arbitrary combination of superimposed and tiled images on display surface 116. Image display system 100 generates sub-frames 110 according to the pixel characteristics of projectors 112 to allow for arbitrary scaling between an image frame 106 and displayed image 114. Image display system 100 also generates sub-frames 110 such that a simulated image 306, represented by $\hat{X}$ and also referred to as X-hat, (shown in FIG. 3) formed from sub-frames 110 approximates a target image 406, represented by $\tilde{X}$ and also referred to as X-tilde, for each image frame 106 to be displayed subject to smoothing constraints. Image display system 100 derives target image 406 from the luminance, color, and black offset properties of projectors 112.

Target image 406 represents the nearest approximation of image frame 106 that image display system 100 can produce given the luminance, color, and black offset properties of projectors 112. To cause simulated image 306 to be as close as possible to the actual appearance of displayed image 114, image display system 100 generates sub-frames 110 so that simulated image 306 approximates target image 406 subject to smoothing constraints. Accordingly, image display system 100 generates optimal sub-frames 110 by minimizing the difference between simulated image 306 and target image 406. The formation of simulated image 306 and target image 406 will now be described with reference to FIGS. 3 and 4, respectively.

Figure 3:
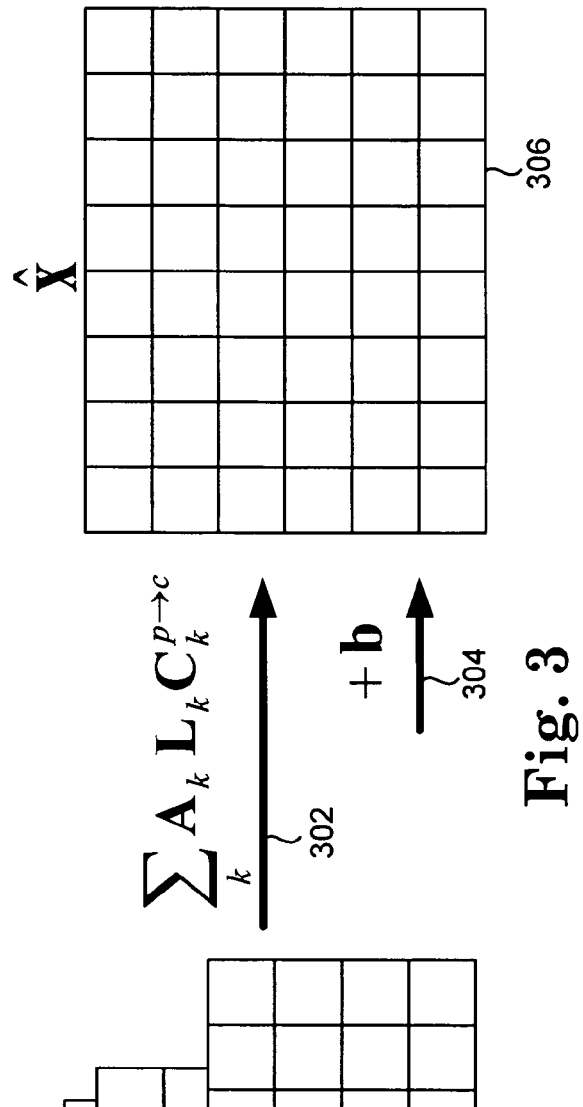
FIG. 3 is a schematic diagram illustrating one embodiment of a model of a simulated image formation process.

FIG. 3 is a schematic diagram illustrating one embodiment of a model of a simulated image formation process performed by sub-frame generator 108 in image display system 100. Sub-frames 110(1)-(N) are represented in the model by $Y_k$, where "k" is an index for identifying the individual projectors 112. Thus, $Y_1$, for example, corresponds to sub-frame 110(1) for projector 112(1), $Y_2$ corresponds to sub-frame 110(2) for projector 112(2), etc.

Sub-frame generator 108 incorporates a color profile, $C_k^{p \rightarrow c}$, for each projector 112 with reference to camera 122 into the simulated image formation model to model the color variations between each projector 112 and camera 122, and a luminance profile, $L_k$, for each projector 112 into the simulated image formation model to model the luminance variations by of each projector 112. Sub-frame generator 108 also incorporates a resampling filter, $A_k$, for each projector 112 into the simulated image formation model to model the geometric mapping, $M_k$, between sub-frames 110 and simulated image 306 and the pixel characteristics of sub-frames 110 and simulated image 306. Sub-frame generator 108 further incorporates a black offset profile, b, for image display system 100 into the simulated image formation model to models the black offset of image display system 100. In some embodiments, the black offset profile includes any ambient light on display surface 116.

Sub-frame generator 108 forms simulated image 306 by applying the color profiles, luminance profiles, reconstruction filters to sub-frames 110, as indicated by an arrow 302 in FIG. 3, and by applying the black offset profile, as indicated by arrow 304 in FIG. 3. The formation of simulated image 306 is shown in Equation I.

$$\hat{X} = \sum_k A_k L_k C_k^{p \to c} Y_k + b \qquad \text{Equation I}$$

where:
k=index for identifying projectors 112;
$\hat{X}$=simulated image 306;
$A_k$=resampling filter of the kth projector 112;
$L_k$=luminance profile of the kth projector 112;
$C_k^{p \to c}$=color profile of the kth projector 112 with reference to camera 122;
$Y_k$=sub-frame 110 of the kth projector 112; and
b=black offset profile for image display system 100.

To determine the color profiles, calibration unit 124 performs a color calibration using camera 122 in one embodiment. In the color calibration, projectors 112 project known color calibration images and camera 122 captures the displayed calibration images. In one embodiment, the color calibration images may be red, green, and blue images in sequence. Calibration unit 124 determines a color profile, $C_k^{p \to c}$, for each projector 112 from the projected and captured calibration images to map the color values of projectors 112 to corresponding values in the camera space of camera 122. In one embodiment, each color profile is a 3×3 matrix that maps red, green, and blue values between a projector 112 and camera 122. In other embodiments, other color calibration techniques may be used.

To determine the luminance profiles, $L_k$, calibration unit 124 performs a luminance calibration using camera 122 in one embodiment. In one embodiment, calibration unit 124 determines the luminance profiles from the captured calibration image from the color calibration. In other embodiments, projectors 112 project known luminance calibration images (e.g., grey patterns with values between 0 and 255 or single color channel patterns such as red, green, and blue) and camera 122 captures the displayed calibration images. Calibration unit 124 maps the nonlinear gamma function of luminance as a function of each projector 112 using the projected and captured calibration images to generate the luminance profiles. In one embodiment, camera 122 is pre-calibrated using a spot photometer to characterize the flat field of camera 122 and account for any vignetting effects of camera 122 prior to capturing the displayed calibration images. In one embodiment, the luminance calibration is performed according to the techniques described in U.S. patent application Ser. No. 11/258,624, filed on Oct. 26, 2005, and entitled LUMINANCE BASED MULTIPLE PROJECTOR SYSTEM, which is hereby incorporated by reference herein. In other embodiments, other luminance calibration techniques may be used.

In one embodiment, the resampling filters, $A_k$, are determined according to the embodiment described below with reference to block 502 of FIG. 5. In other embodiments, resampling filters may be determined using other suitable techniques.

To determine the black offset profile, b, calibration unit 124 performs a black offset calibration using camera 122 in one embodiment. In the black offset calibration, all projectors 112 simultaneously project calibration images with all zeros or all black values and camera 122 captures the displayed calibration images. Calibration unit 124 determines a black offset profile by measuring the luminance in the captured calibration images. In other embodiments, other black offset calibration techniques may be used such as by having projectors 112 individually project calibration images with all zeros or all black values, capturing a displayed calibration images for each projector 112, and summing the measured luminance in the captured calibration images. In determining the black offset profile, calibration unit 124 may optionally account for any ambient light on display surface 112 by capturing an image of display surface 116 with camera 122 with all projector 112 turned off.

Figure 4:
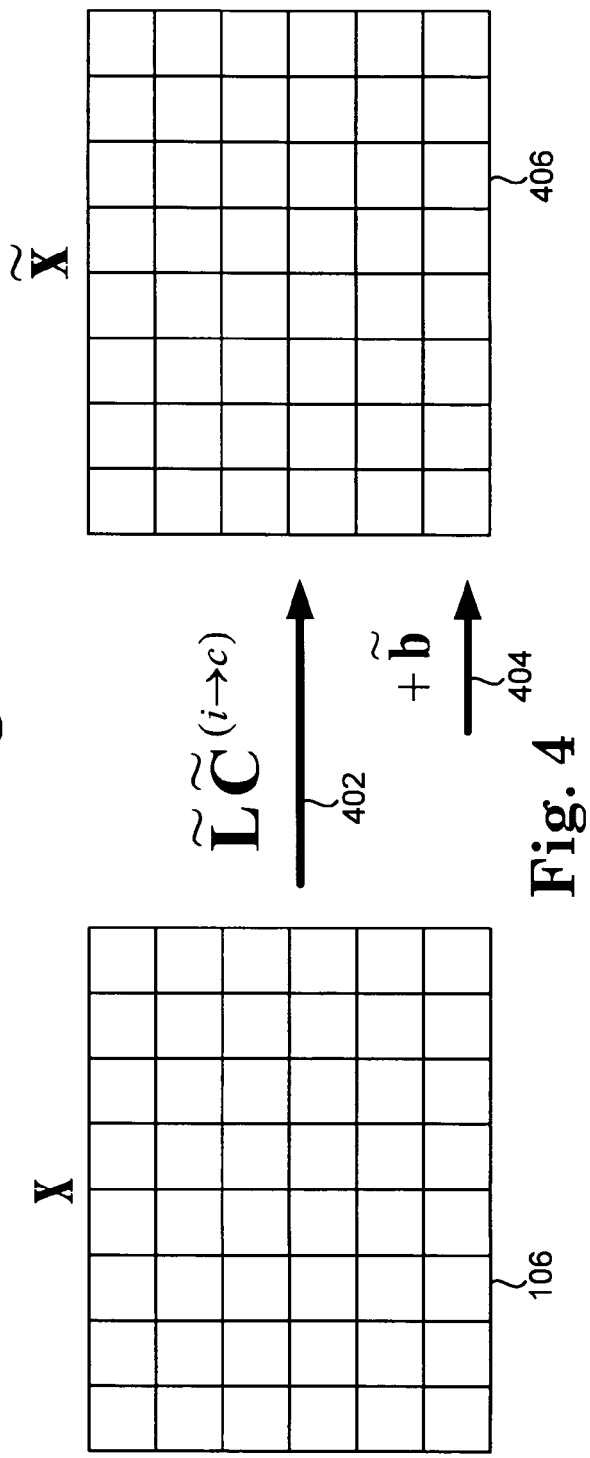
FIG. 4 is a schematic diagram illustrating one embodiment of a model of a target image formation process.

FIG. 4 is a schematic diagram illustrating one embodiment of a model of a target image formation process performed by sub-frame generator 108 in image display system 100. Sub-frame generator 108 incorporates a target color profile, $\tilde{C}^{(i \to c)}$, of image display system 100 from the image space of image frame 106 to the camera space of camera 122 into the target image formation model to model the feasible color range of image display system 100 and a target luminance profile, $\tilde{L}$, of image display system 100 into the target image formation model to model the feasible luminance range of image display system 100. Sub-frame generator 108 further incorporates a target black offset profile, $\tilde{b}$, for image display system 100 into the target image formation model to models the minimum desired black offset of image display system 100.

Sub-frame generator 108 forms target image 406 by applies the target color and luminance profiles to image frame 106, as indicated by an arrow 402 in FIG. 4, and applying the target black offset profile, as indicated by arrow 404 in FIG. 4. The formation of target image 406 is shown in Equation II.

$$\tilde{X} = \tilde{L}\tilde{C}^{(i \to c)}X + \tilde{b} \qquad \text{Equation II}$$

where:
$\tilde{X}$=target image 406;
$\tilde{L}$=target luminance profile of image display system 100;
$\tilde{C}^{(i \to c)}$=target color profile of image display system 100 from image space of image frame 106 to camera space of camera 122;
X=image frame 106; and
$\tilde{b}$=target black offset profile of image display system 100.

Calibration unit 124 determines the target color profile, $\tilde{C}^{(i \to c)}$, by determining an intersection gamut of the measured color profiles, $C_k^{p \to c}$, in one embodiment. In other embodiments, calibration unit 124 determines the target color profile using other suitable techniques.

Calibration unit 124 determines the target luminance profile, $\tilde{L}$, by using the luminance color profiles, $L_k$, in one embodiment. To do so, calibration unit 124 sums the luminance color profiles, $L_k$, smoothes the sum, and sets the target luminance profile, $\tilde{L}$, to be less than or equal to the smoothed sum of the luminance color profiles, $L_k$. In other embodiments, calibration unit 124 determines the target luminance profile using other suitable techniques.

Calibration unit 124 determines the target black offset profile, $\tilde{b}$, by smoothing the measured black offset profile, b, and ensuring that the target black offset profile is greater than or equal to the measured black offset profile in one embodiment. In other embodiments, calibration unit 124 determines the target black offset profile using other suitable techniques.

In one embodiment, sub-frame generator 108 performs the process of generating optimal sub-frames 110, $Y'_k$, for each projector 112 in two phases. In a first phase, sub-frame generator 108 determines an optimal sub-pixel blending map, $H'_k$, for each projector 112, an inverted color profile, $C_k^{-1}$, for each projector, the target color profile for image display system 100, $\tilde{C}$, as described above, and an optimal black offset correction, $b'_k$, for each projector 112. Sub-frame generator 108 uses the optimal sub-pixel blending maps, the inverted color profiles, the target color profile, and the optimal black offset corrections to generate optimal sub-frames 110, $Y'_k$, in a second phase.

In one embodiment, the first phase is an offline training phase that is performed as part of a calibration process of image display system 100, and the second phase is a run-time phase that is performed during the normal operation of image display system 100 in generating and display sub-frames 110.

Figure 5:
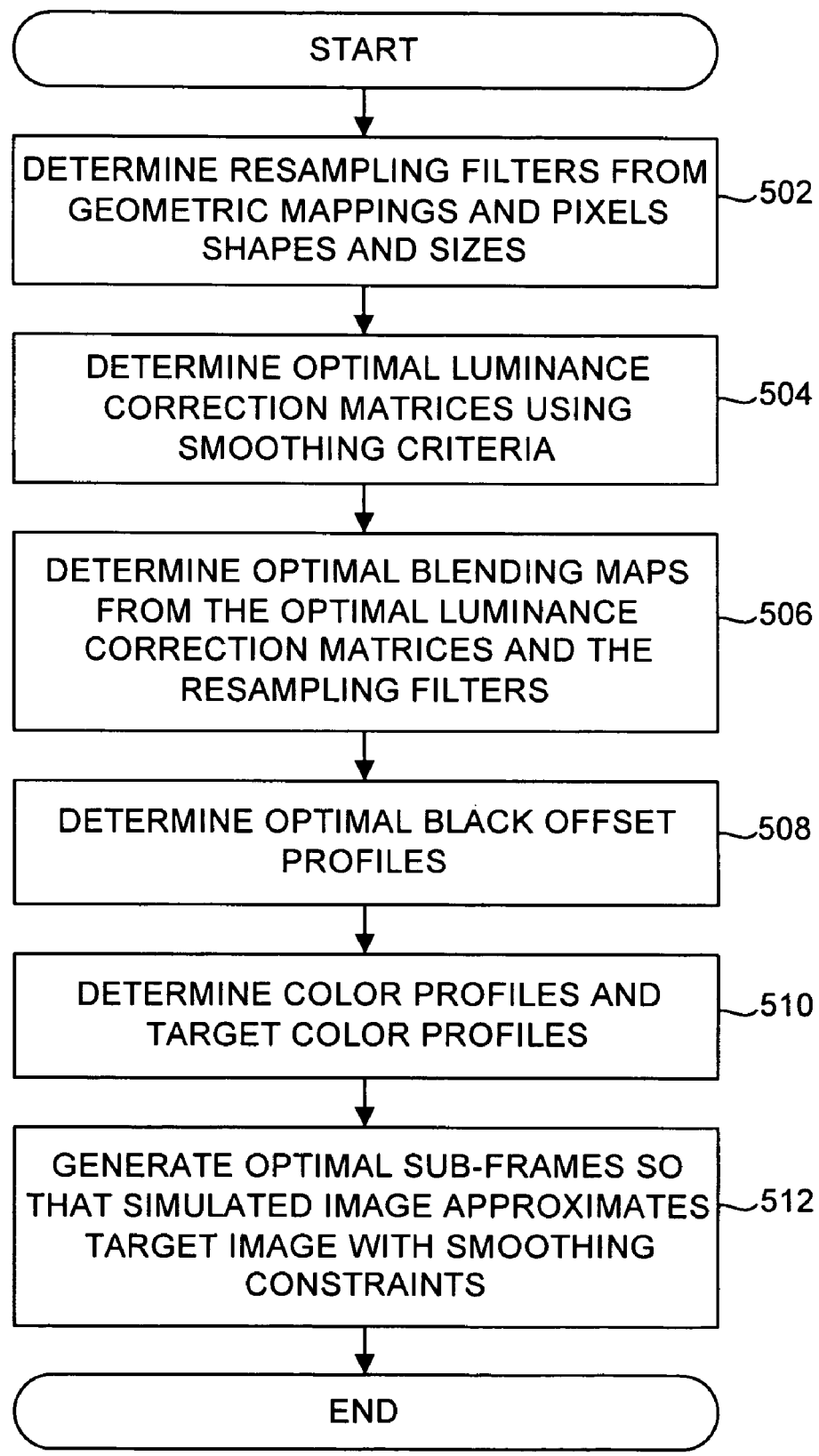
FIG. 5 is a flow chart illustrating one embodiment of a method for generating optimal sub-frames.

FIG. 5 is a flow chart illustrating one embodiment of a method for generating optimal sub-frames 110. The functions of blocks 502, 504, 506, 508, and 510 (described below) may be performed during the first phase and the function of block 512 (described below) may be performed during the second phase as just described.

Sub-frame generator 108 determines a resampling filter, $A_k$, for each projector 112 using geometric mappings between the projectors 112 and a reference coordinate system and pixel shapes and sizes of projectors 112 as indicated in a block 502. Image display system 100 first determines or is provided with geometric mappings ($M_k$) between each projector 112 and the reference coordinate system. Using the geometric mappings, sub-frame generator 108 determines high and low resolution bounding boxes, also referred to as cropped display areas, as described below with reference to FIGS. 6A and 6B. Sub-frame generator 108 determines the resampling filters using the bounding boxes to cause sub-frames 110 to be generated for display within regions of display surface 116 that correspond to the bounding boxes. Image display system 100 is also provided with information that describes the pixel characteristics of each projector 112 and the pixel characteristics of simulated image 306 in the form of reconstruction filters, $R_k^y$ and $R^x$, respectively. Sub-frame generator 108 determines resampling filters from the geometric mappings, bounding boxes, and reconstruction filters.

Operator $M_k$ models the geometric transformation of image display system 100 to map coordinates in frame buffer 113 of the $k^{th}$ projector 112 to a reference coordinate system, such as the frame buffer 120 of the reference projector 118 (FIG. 1), with sub-pixel accuracy. In one embodiment, $M_k$ is linear with respect to pixel intensities, but is non-linear with respect to the coordinate transformations.

Several techniques are available to determine geometric mappings ($M_k$) between each projector 112 and the reference projector 118, including manually establishing the mappings, or using camera 122 and calibration unit 124 (FIG. 1) to automatically determine the mappings. Techniques for determining geometric mappings that are suitable for use in one form of the present invention are described in U.S. patent application Ser. No. 10/356,858, filed Feb. 3, 2003, entitled MULTIFRAME CORRESPONDENCE ESTIMATION, and U.S. patent application Ser. No. 11/068,195, filed Feb. 28, 2005, entitled MULTI-PROJECTOR GEOMETRIC CALIBRATION, both of which are hereby incorporated by reference herein.

In one embodiment, if camera 122 and calibration unit 124 are used, the geometric mappings between each projector 112 and camera 122 are determined by calibration unit 124. These projector-to-camera mappings may be denoted by $T_k$, where k is an index for identifying projectors 112. Based on the projector-to-camera mappings ($T_k$), the geometric mappings ($M_k$) between each projector 112 and the reference projector 118, i.e., the reference coordinate system, are determined by calibration unit 124, and provided to sub-frame generator 108. The geometric mapping of the kth projector 112 to the reference coordinate system can be determined as shown in Equation III.

$$M_k = S^{-1} T_k \qquad \text{Equation III}$$

where:

$M_k$=operator that maps a sub-frame 110 of the kth projector 112 to the reference coordinate system;

$S^{-1}$=geometric mapping between the reference coordinate system and the camera 122; and $T_k$=geometric mapping between the kth projector 112 and camera 122.

In one embodiment, the geometric mappings ($M_k$) are determined once by calibration unit 124, and provided to sub-frame generator 108. In another embodiment, calibration unit 124 continually determines (e.g., once per frame 106) the geometric mappings ($M_k$), and continually provides updated values for the mappings to sub-frame generator 108.

Figure 6A:
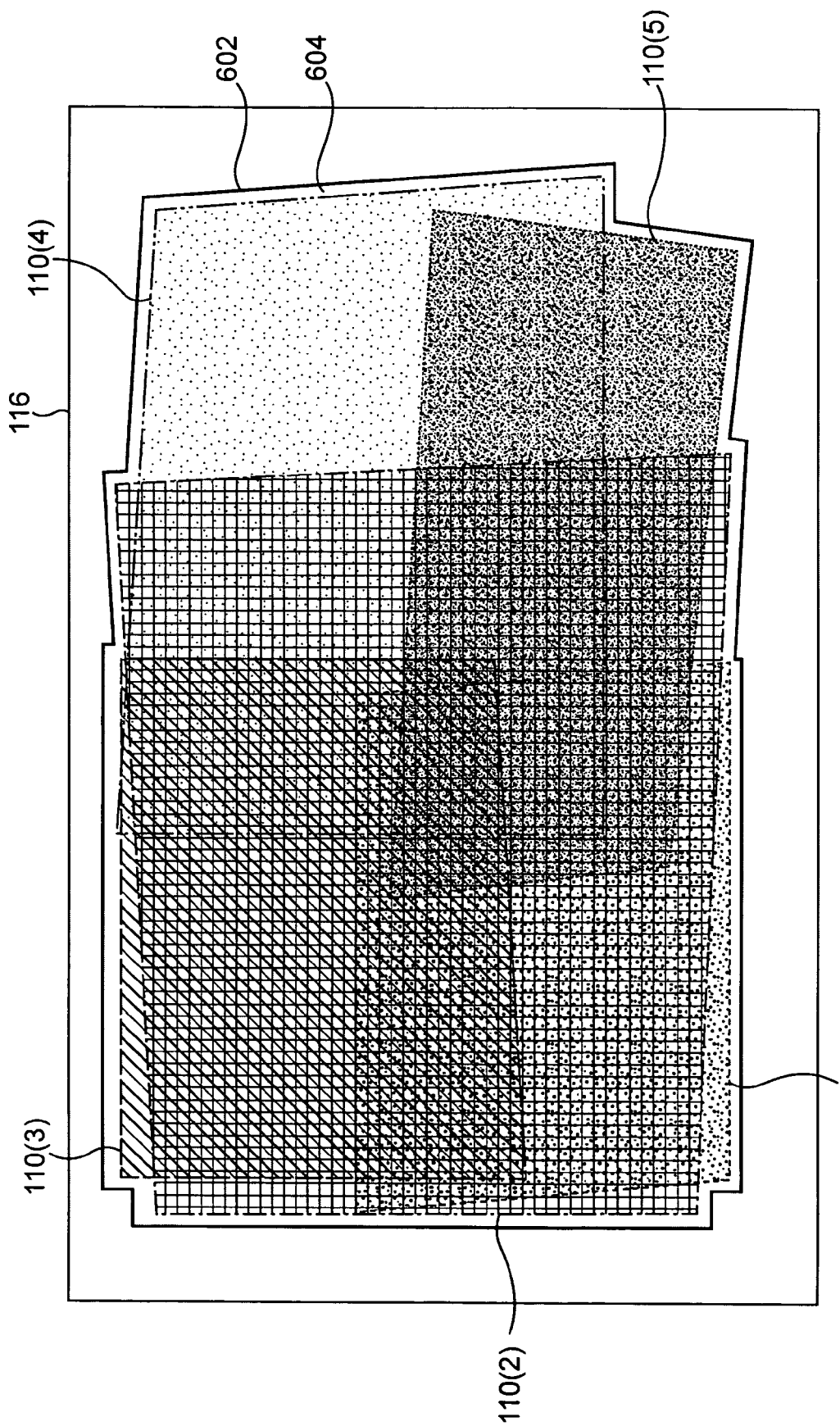
FIGS. 6A-6B are diagrams illustrating one embodiment of the projection of a plurality of sub-frames onto a display surface.

FIG. 6A is a diagram illustrating one embodiment of the projection of a plurality of sub-frames 110 onto display surface 116. FIG. 6A shows sub-frames 110(1)-110(5) to represent five sub-frames 110 projected onto display surface 116 by five different projectors 112. In the embodiment shown in FIG. 6A, each of the sub-frames 110 has a quadrilateral shape, and the sub-frames 110 overlap each other in varying degrees. In one embodiment, the projected sub-frames 110 are all superimposed sub-frames. In another embodiment, the projected sub-frames 110 are all tiled sub-frames. In yet another embodiment, the projected sub-frames 110 include a combination of tiled and superimposed sub-frames (e.g., two tiled sub-frames 110, and two superimposed sub-frames 110 that substantially overlap each other and that each substantially overlap both of the tiled sub-frames 110).

In one embodiment, two projected sub-frames 110 are defined to be tiled sub-frames if the area of any overlapping portion is less than about twenty percent of the total area of one of the projected sub-frames on the display surface 116, and two projected sub-frames are defined to be superimposed sub-frames if the area of the overlapping portion is eighty percent or more of the total area of one of the projected sub-frames on the display surface 116. In another embodiment, where two or more sub-frames 110 overlap on display surface 116, regardless of the amount of overlap, the overlapping region may be regarded as superimposed, and the resolution of the projected image in the overlapping region can be enhanced by using optimized sub-frames. An arbitrary overlap can be regarded as a superposition since, fundamentally, light is being superimposed. In a tiled region where there is no overlap, the light being superimposed from all except one projector 112 is close to zero.

A global boundary 602 completely encompasses the five sub-frames 110 shown in FIG. 6A. Global boundary 602 traces the portions of sub-frame edges located farthest away from the center of display surface 116. The area within global boundary 602 is referred to herein as target display area (or total display area) 604. Target display area 604 represents the total display area covered by all of projectors 112 in the display system 100.

In one embodiment, images of the projected sub-frames 110(1)-(5) are captured by camera 122 (shown in FIG. 1) and analyzed by calibration unit 124 (shown in FIG. 1) to determine characteristics of the current projector configuration. Calibration unit 124 identifies global boundary 602 in the reference coordinate system that encompasses all of the projected sub-frames 110. The global boundary 602 defines target display area 604. In one embodiment, calibration unit 124 analyzes the geometric mappings ($M_k$) to calculate the global boundary 602. In one embodiment, calibration unit 124 analyzes the image boundaries (i.e., local boundaries) of the sub-frames 110 projected by each of projectors 112 and determines a global boundary 602 to include each of the local boundaries of projected sub-frames 110. Calibration unit 124 analyzes target display area 604 and determines the number of projectors 112 that are mapped to each pixel or region of target display area 604. In one embodiment, calibration unit 124 assesses target display area 604 to determine the amount of overlap of sub-frames 110.

Calibration unit 124 identifies at least one rectangle that lies entirely within target display area 604. The area within each identified rectangle defines a cropped display area. In one embodiment, calibration unit 124 identifies the at least one rectangle by geometrically mapping or warping the four corners of the field of view of each projector 112 to a reference coordinate system, such as the coordinate system of reference projector 118 (shown in FIG. 1) and then determining an appropriate rectangle in the reference coordinate system based on the mapped corners.

Figure 6B:
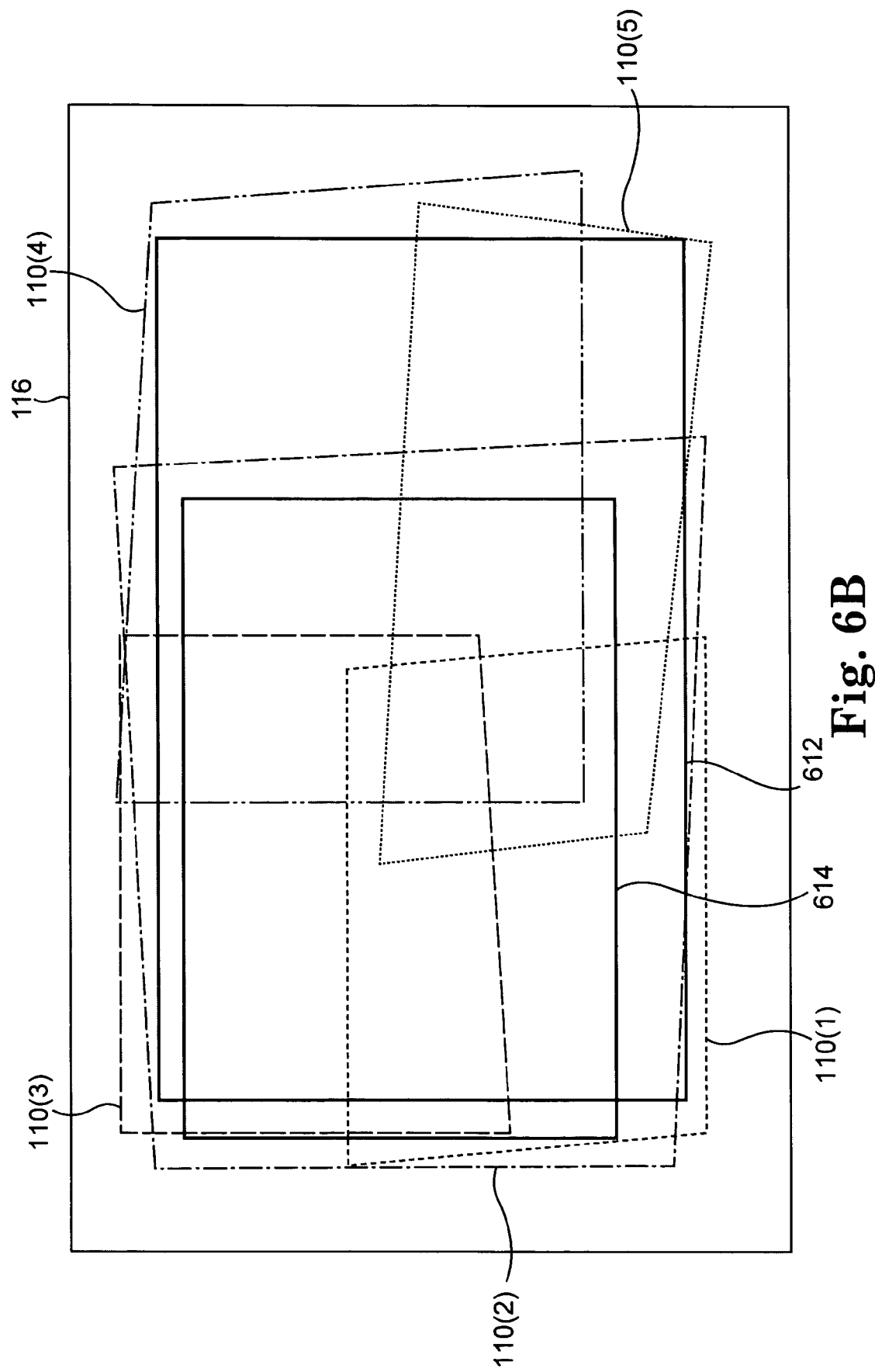

FIG. 6B is a diagram illustrating one embodiment of rectangles identified by calibration unit 124 for the projection of sub-frames 110(1)-(5) shown in FIG. 6A. In FIG. 6B, dashed lines illustrate the boundaries of sub-frames 110(1)-(5). FIG. 6B also includes two cropped display areas 612 and 614 that correspond to rectangles identified by calibration unit 124.

In the illustrated embodiment, cropped display areas 612 and 614 represent the largest aspect ratio preserving rectangles that lie entirely within global boundary 602 and that correspond to a particular brightness level. In the illustrated embodiment, cropped display area 612 corresponds to a brightness parameter equal to "1", and cropped display area 614 corresponds to a brightness parameter equal to "2". A brightness parameter of "1" indicates that all points within the cropped display area are covered by at least one projector 112. A brightness parameter of "2" indicates that all points within the cropped display area are covered by at least two projectors 112. Typically, the higher the brightness parameter, the smaller the cropped display area will be. In one embodiment, the cropped display areas 612 and 614 are computed to have the same aspect ratio as that of the image data 102. In another embodiment, the cropped display area is the largest rectangular area that fits within the global boundary 602 regardless of aspect ratio.

In one embodiment, the edges linking successive pairs of mapped corners are considered to be half-plane constraints (i.e., each edge may be viewed mathematically as a line separating points that lie inside the mapped field of view and points that lie outside the mapped field of view). The problem then becomes choosing the right set of constraint lines (half-spaces), and performing a linear program with constraints. For example, the optimal rectangle of a fixed aspect ratio is defined by two offset parameters (x0, y0) and a scale factor parameter (alpha). The linear program involves finding the values for these three parameters such that the entire rectangle lies on or inside of the appropriate half-spaces.

In one embodiment, calibration unit 124 is configured to display information regarding the current projector configuration to a user and allow the user to interactively adjust the display characteristics. In another embodiment, calibration unit 124 is configured to allow a user to specify coordinates, and thereby the transformation between camera 122 and the reference coordinate system, to adjust the display characteristics.

To model the pixel characteristics of projector 112 and simulated image 306, image display system 100 uses parametric transform dependent filters in one embodiment.

Image display system 100 is also provided with information that describes the pixel characteristics (e.g., pixel shapes and sizes such as Gaussian, square, or diamond) of each projector 112 and the pixel characteristics (e.g., pixel shapes and sizes) of simulated image 306 in the form of reconstruction filters, $R_k^Y$ and $R^X$, respectively. A sub-frame reconstruction filter, $R_k^Y$, (also referred to as a low-resolution reconstruction filter in one embodiment) for each projector 112 identifies the pixel characteristics of sub-frames 110 when displayed by projectors 112. A simulated image reconstruction filter, $R^X$, (also referred to as a high-resolution reconstruction filter in one embodiment) simulates the pixel characteristics of a simulated image formed from the display of sub-frames 110. Image display system 100 uses the reconstruction filters along with the geometric mappings to determine the resampling filters, $A_k$, and the transposed resampling filters, $A_k^T$, as will now be described.

In one embodiment, each transposed resampling filter, $A_k^T$, includes a set of weighted filter coefficients for each pixel location in a corresponding projector 112. Sub-frame generator 108 determines each set of weighted filter coefficients by warping a pre-filter that is centered on a pixel location of a sub-frame 110 onto the grid of simulated image 306 and convolving the warped pre-filter with a simulated image reconstruction filter of simulated image 306. The pre-filter defines a shape that is to be warped onto the grid of simulated image 306, and the reconstruction defines the pixel characteristics of simulated image 306.

Figure 7:
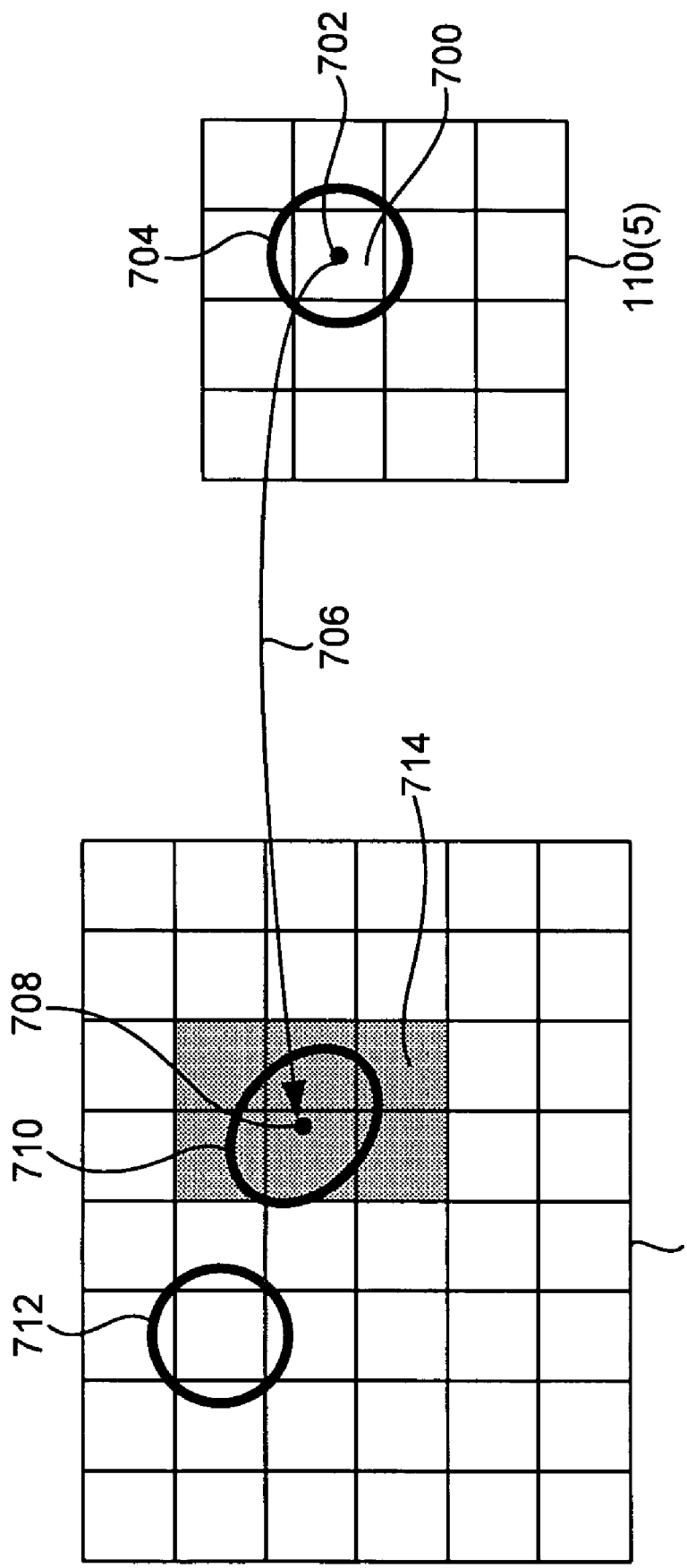
FIG. 7 is a diagram illustrating one embodiment of determining a resampling filter.

FIG. 7 is a diagram illustrating an example of determining a set of filter coefficients for a transposed resampling filter, $A_5^T$. For a pixel 700 in the grid of a sub-frame 110(5), sub-frame generator 108 maps pixel center 702 of pixel 700 to a location 708 in the grid of simulated image 306 using the geometric mapping determined above for projector 112(5) which corresponds to sub-frame 110(5). Sub-frame generator 108 warps a pre-filter 704 that is centered on pixel center 702 and convolves the warped pre-filter with a simulated image reconstruction filter 712 to generate a shape 708. Sub-frame generate 108 identifies a set of shaded pixels 714 in the grid of simulated image 306 that are at least partially covered by shape 708. For each pixel in the set of pixels 714, sub-frame generator 108 assigns a weighting based on the amount that shape 708 covers that pixel. Sub-frame generator 108 stores the weightings as set of filter coefficients for pixel 700. Sub-frame generator 108 determines a set of filter coefficients for the remaining pixels in sub-frame 110(5) as just described and stores the sets as transposed resampling filter, $A_5^T$, for sub-frame 110(5).

Sub-frame generator 108 forms a transposed resampling filter, $A_k^T$, for each projector 112 as just described in one embodiment. Sub-frame generator 108 uses the sets of filter coefficients in the process of generating the pixel values in sub-frame 110. For example, to compute a pixel value for pixel 700 in in sub-frame 110(5), sub-frame generator 108 determines a weighted average of pixel values from pixel locations in image frame 106 that correspond to the set of pixel locations 714 in simulated image 306 using the set of weighted filter coefficients for pixel 700.

In one embodiment, sub-frame generator 108 determines resampling filters, $A_k$, using sub-frame reconstructions filters and a pre-filter for pixels on simulated image 306 in a manner analogous to determining transposed resampling filters, $A_k^T$, as just described.

The determination of resampling filters, $A_k$, and transposed resampling filters, $A_k^T$, is further illustrated in Equations IV-VII. In Equation IV, sub-frames 110, $Y_k$, are warped using respective geometric mappings $M_k^{-1}$ and reconstructed using respective sub-frame reconstruction filters, $R_k^Y$, to form a reconstructed continuous image on a continuous grid.

$$\hat{X}(x) = \sum_k \sum_i R_k^Y(M_k^{-1}x - i)Y_k[i] \quad \text{Equation IV}$$

where:
  k=index for identifying projectors 112;
  i=discrete pixel values of sub-frames 110;
  $\hat{X}(x)$=reconstructed simulated image 306 on a continuous grid;
  $R_k^Y$=reconstruction filter of the kth sub-frame 110;
  $M_k^{-1}$=inverted geometric warp between kth sub-frame 110 and a reference coordinate system; and
  $Y_k[i]$=kth sub-frame 110 on discrete grid.

In Equation V, sub-frames 110, $Y_k$, are warped using respective geometric mappings $M_k^{-1}$, reconstructed using respective sub-frame reconstruction filters, $R_k^Y$, and pre-filtered using a pre-filter, $P^X$, to form a simulated image on a discrete grid.

$$\hat{X}[l] = \sum_k \int_x P^X(l-x) \sum_i R_k^Y(M_k^{-1}x - i)Y_k[i]dx \quad \text{Equation V}$$

where:
  k=index for identifying projectors 112;
  x=continuous pixel values of simulated image 306;
  $\hat{X}(l)$=reconstructed simulated image 306 on a discrete grid;
  $P^X$=pre-filter for continuous grid of simulated image 306;
  $R_k^Y$=reconstruction filter of kth sub-frame 110;
  $M_k^{-1}$=inverted geometric warp between kth sub-frame 110 and a reference coordinate system; and
  $Y_k[i]$=kth sub-frame 110 on discrete grid.

Terms in Equation V may be grouped to form $\rho_k[i,l]$ as shown in Equation VI.

$$\hat{X}[l] = \sum_k \sum_i Y_k[i]\rho_k[i,l] \quad \text{Equation VI}$$

where:
  k=index for identifying projectors 112;
  i=discrete pixel values of sub-frames 110;
  $\hat{X}(l)$=reconstructed simulated image 306 on a discrete grid;
  $Y_k[i]$=kth sub-frame 110 on discrete grid; and
  $P\rho_k[i,l]$=substituted term from Equation V.

A shown in Equation VII, a change of variables may be performed on $\rho_k[i,l]$.

$$\rho_k[i,1] = \int_x P^X(l-x)R_k^Y(M_k^{-1}x - i)dx \quad \text{Equation VII}$$
$$= \int_u P^X(l - M_k u)R_k^Y(u - i)\left|\frac{\partial M_k}{\partial u}\right|du$$

where:
  k=index for identifying projectors 112;
  $P^X$=pre-filter for continuous grid of simulated image 306;
  $R_k^Y$=reconstruction filter of kth sub-frame 110;
  $M_k^{-1}$=inverted geometric warp between kth sub-frame 110 and a reference coordinate system; and
  $M_k$=geometric warp between kth sub-frame 110 and a reference coordinate system.

Using the Equations IV-VII, sub-frame generator 108 may generate the sets of filter coefficients for resampling filters, $A_k$, and transposed resampling filters, $A_k^T$, for known values of i, l, and x.

Each resampling filters, A, effectively allows upsampling, filtering, warping, pre-filtering, and resampling onto the grid of simulated image 306 to be performed on as shown in Equation VIII.

$$\hat{X} = \sum_k \underbrace{DPF_k H_k D_S^T Z_k}_{A_k} \quad \text{Equation VIII}$$

where:
  k=index for identifying projectors 112;
  $\hat{X}$=simulated image 306;
  D=resampling operator;
  P=pre-filter of simulated image 306;
  $F_k$=geometric mapping between sub-frame 110 of the kth projector 112 on the grid of simulated image 306 and the reference coordinate system;
  $H_k$=interpolating filter for sub-frame 110 from the kth projector 112;
  $D_S^T$=up-sampling matrix;
  $A_k$=resampling filter of the kth projector 112; and
  $Z_k$=image from the kth projector 112.

Accordingly, each resampling filters, $A_k$, is used to form simulated image 306 as shown in Equation IX.

$$\hat{X} = \sum_k A_k Z_k \quad \text{Equation IX}$$

where:
  k=index for identifying projectors 112;
  $\hat{X}$=simulated image 306;
  $A_k$=resampling filter of the kth projector 112; and
  $Z_k$=sub-frame 110 of the kth projector 112 on the grid of simulated image 306.

Referring to FIG. 5, sub-frame generator 108 determines an optimal luminance correction matrix, $L'_k$, for each projector 112 as indicated in a block 504. To do so, sub-frame generator 108 derives optimal luminance corrections, I'$_k$, to achieve the target luminance profile, $\tilde{L}$, from Equation II to sub-pixel accuracy for any arbitrary combination of projectors 112 subject to smoothness constraints described below with reference to Equations X and XI.

Because the target luminance profile, $\tilde{L}$, is a diagonal matrix in one embodiment, the target luminance profile may be applied to image frame 106 before the target color profile, $\tilde{C}$. Accordingly, sub-frame generator 108 determines optimal luminance corrections, I'$_k$, to cause simulated image 306 to approximate the target luminance profile subject to smoothing constraints as shown in Equation X.

$$1'_j = \underset{1'_j}{\operatorname{argmin}} \alpha \underbrace{\left\| \tilde{L}1 - \sum_k A_k L_k 1'_k \right\|^2}_{e} +$$

$$\delta \left\| \nabla \tilde{L}1 - \nabla \sum_k A_k L_k 1'_k \right\|^2 + \beta \sum_k \| \nabla 1'_k \|^2 \quad \text{Equation X}$$

where:
- j=index for identifying a projector 112;
- k=index for identifying projectors 112;
- I'$_j$=optimal luminance correction for jth projector 112;
- α=smoothing constant;
- $\tilde{L}$1=target luminance profile of image display system 100 with all 1's (all white images);
- A$_k$=resampling filter of the kth projector 112;
- L$_k$=luminance profile of the kth projector 112;
- I'$_k$=optimal luminance correction for kth projector 112;
- δ=smoothing constant;
- ∇=gradient operator;
- β=smoothing constant;
- e=error term.

In Equation X, the error term, e, is determined as the difference between the target luminance profile with of image display system 100 with all 1's and simulated image 306 (omitting color corrections) with the optimal luminance correction. Equation X also includes two smoothing constraints that specify a relationship between the target luminance profile and a simulated luminance image formed using the optimal luminance corrections. The first constraint seeks to minimize the difference between the gradient of the target luminance profile with of image display system 100 with all 1's and the gradient of simulated image 306 (omitting color corrections) with the optimal luminance correction. The second constraint seeks to minimize the gradient of the optimal luminance correction.

Equation X may be solved using an iterative algorithm expressed by Equation XI.

$$I'^{(n+1)}_j = I'^{(n)}_j + L_j A_j^T (\alpha e + \delta \nabla^2 e) - \beta \nabla^2 I'^{(n)}_j \quad \text{Equation XI}$$

where:
- j=index for identifying a projector 112;
- n=index for identifying iterations;
- I'$_j^{(n+1)}$=optimal luminance correction for jth projector 112 for iteration n+1;
- I'$_j^{(n)}$=optimal luminance correction for jth projector 112 for iteration n;
- L$_j$=luminance profile of the jth projector 112;
- A$_j^T$=transposed resampling filter of the jth projector 112;
- α=smoothing constant;
- e=error term from Equation XI;
- δ=smoothing constant;
- ∇=gradient operator; and
- β=smoothing constant;

Because Equation XI may be slow to converge, a multi-resolution optimization may be applied to solve Equation XI. With a multi-resolution optimization, sub-frame generator 108 downsamples the terms in Equation XI to a lower resolution and solves for the optimal luminance corrections at the lower resolution or coarse level. Sub-frame generator 108 upsamples the terms back to the original resolution and solves for the optimal luminance corrections at the original resolution or fine level.

Sub-frame generator 108 stores the optimal luminance corrections determined from the multi-resolution optimization in an optimal luminance correction matrix, L'$_k$, for each projector 112. After solving Equation XI, the error term, e, become small and Equation XII becomes true.

$$\tilde{L}X_i \approx \sum_k A_k L_k \{ L'_k A_k^T X_i \} \quad \text{Equation XII}$$

where:
- k=index for identifying projectors 112;
- $\tilde{L}$=target luminance profile;
- X$_i$=image frame 106 with input values i;
- A$_k$=resampling filter of the kth projector 112;
- L$_k$=luminance profile of the kth projector 112;
- L'$_k$=optimal luminance correction matrix of the kth projector 112; and
- A$_k^T$=transposed resampling filter of the kth projector 112.

Referring to FIG. 5, sub-frame generator 108 determines an optimal sub-pixel blending map, H'$_k$, for each projector 112 from the optimal luminance correction matrices for each projector 112 and the transposed resample filters for each projector 112 as indicated in a block 506.

In one embodiment, sub-frame generator 108 determines the optimal sub-pixel blending maps using impulse training as described below with reference to FIG. 8.

Figure 8:
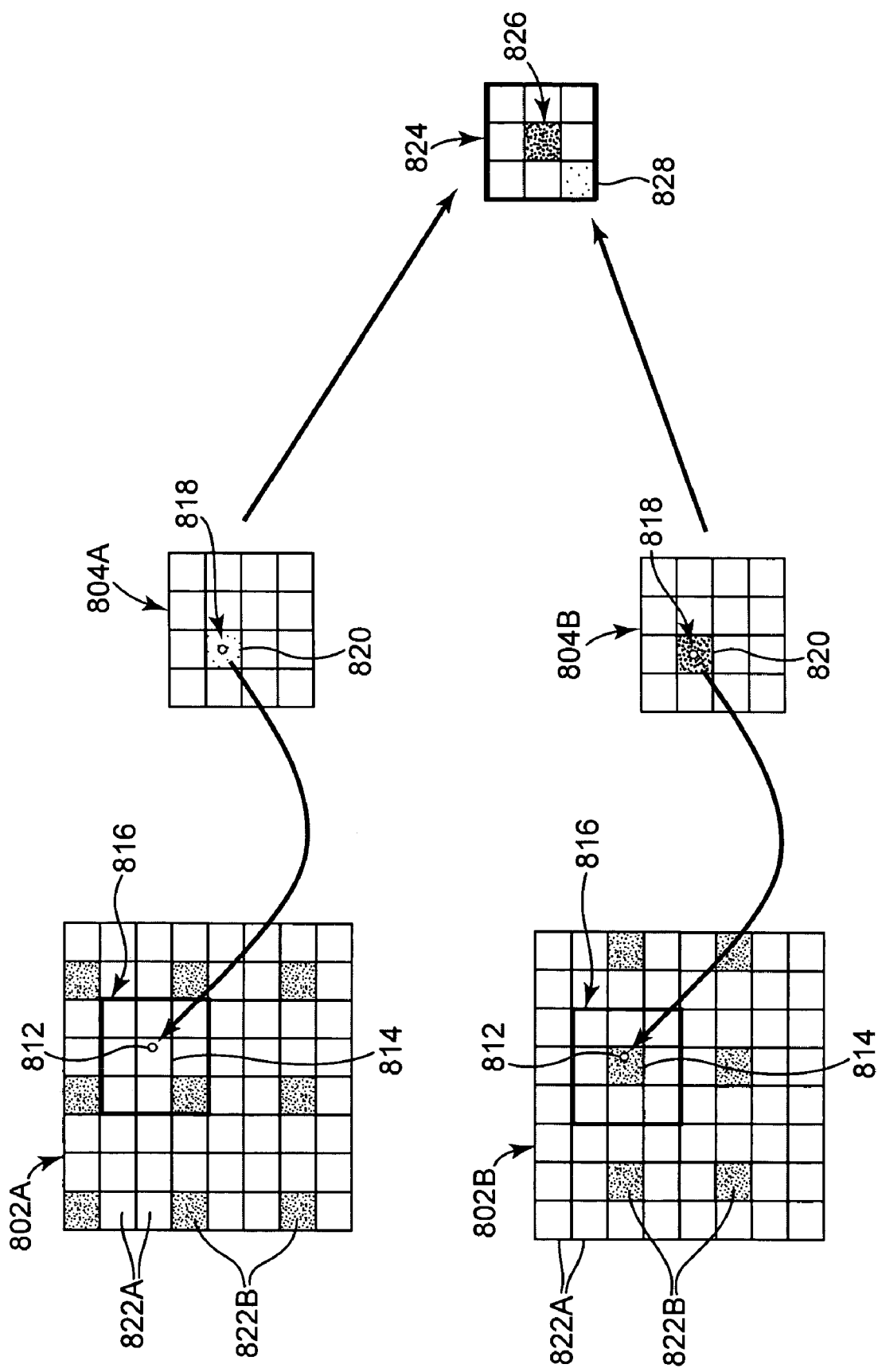
FIG. 8 is a diagram illustrating one embodiment of the projection of a pixel center using impulse training images.

With impulse training, sub-frame generator 108 receives a set of training images 802 (e.g., training images 802A and 802B in FIG. 8). The training images 802 are impulse images (e.g., images with most of the pixels have a zero value, and one or more impulse pixels have a non-zero value, such as a value of one).

Sub-frame generator 108 generates a set of training sub-frames 804 (e.g., sub-frames 804A and 804B in FIG. 8) based on the received training images 802. In one embodiment, for each received training image 802, sub-frame generator 108 generates a corresponding training sub-frame 804 for each projector 112. Training sub-frames 804 may be generated to have the same resolution as sub-frames 110 that are generated during normal operation of image display system 100. Training images 802 and image frames 106 have a higher resolution than training sub-frames 804 and sub-frames 110 in one embodiment.

For each training sub-frame 804, sub-frame generator 108 "projects" each pixel center of training sub-frame 804 onto the training image 802 corresponding to that training sub-frame 804, and identifies a neighborhood or set of W×W pixels in training image 802 located around the projected point. The statement above that the sub-frame generator 108 "projects" a pixel center means that a respective transposed resampling filter and a respective optimal luminance correction matrix are used to map or "project" the pixel centers of sub-frames 804 onto corresponding points in training image 802 as shown in the bracketed term of Equation XII where X$_i$ represents training image 802.

FIG. 8 is a diagram illustrating the projection of a pixel center using impulse training images 802. Two impulse training images 802 (i.e., 802A and 802B) are shown in FIG. 8. Each of the impulse training images 802A and 802B includes a plurality of pixels 822A having a zero value, and a plurality of impulse pixels 822B having a non-zero value.

As shown in FIG. 8, the pixel center 818 of a pixel 820 at location [m,n] in a first 4×4 pixel training sub-frame 804A is mapped or projected to a corresponding point 812 of a pixel 814 at location [k,l] in a first 8×8 pixel impulse training image 802A. A set or neighborhood 816 of pixels in the first impulse training image 802A is identified as the W×W window of pixels centered at pixel 814, where "W" equals three in the illustrated embodiment.

The pixel center 818 of a pixel 820 at location [m,n] in a second 4×4 pixel training sub-frame 804B is mapped or projected to a corresponding point 812 of a pixel 814 at location [k,l] in a second 8×8 pixel impulse training image 802B. A set or neighborhood 816 of pixels in the second impulse training image 802B is identified as the W×W window of pixels centered at pixel 814, where "W" equals three in the illustrated embodiment.

For each pixel of each training sub-frame 804, sub-frame generator 108 determines a set of map coefficients that map the values of the corresponding neighborhood 816 of pixels in impulse training image 802 to the value of the pixel in training sub-frame 804. In one embodiment, the values of the map coefficients are the same as the values of corresponding pixels in training sub-frames 804. For example, as shown in FIG. 8, filter 824 corresponds to neighborhood 816 in the illustrated embodiment. The coefficient for pixel location 828 in filter 824, which corresponds to the position of the impulse pixel 822B within the neighborhood 816 of the first impulse training image 802A (i.e., lower left corner), will have the same value as pixel 820 in the first training sub-frame 804A. The coefficient for pixel location 826 in filter 824, which corresponds to the position of the impulse pixel 822B within the neighborhood 816 of the second impulse training image 802B (i.e., middle), will have the same value as pixel 820 in the second training sub-frame 804B. In one embodiment, in addition to the two impulse training images 802A and 802B, seven more impulse training images 802 are used to generate seven more corresponding training sub-frames 804, and thereby obtain data to fill in the remaining seven coefficients of filter 824. In one embodiment, the nine impulse training images 802 include impulse pixels 822B that are positioned such that, if the impulse training images 802 were superimposed, the impulse pixels 822B would cover every pixel position.

Sub-frame generator 108 generates a filter 824 for each pixel in a sub-frame 110 and stores the set of filters 824 as the optimal sub-pixel blending map for that sub-frame 110. Accordingly, sub-frame generator 108 generates optimal sub-pixel blending maps for each sub-frame 110 as just described.

Referring to FIG. 5, sub-frame generator 108 determines an optimal black offset correction, b'$_k$, for each projector 112 as indicated in a block 508. To determine the optimal black offset corrections, sub-frame generator 108 determines the target black residual as shown in Equation XIII.

$$\tilde{r} = \tilde{b} - b \quad \text{Equation XIII}$$

where:

$\tilde{r}$=target residual profile of image display system 100;

$\tilde{b}$=target black offset profile of image display system 100; and b=black offset profile of image display system 100.

Sub-frame generator 108 derives the optimal black offset corrections to achieve the target residual profile as shown in Equation XIV.

$$b'_j = \operatorname*{argmin}_{b'_j} \underbrace{\left\| \tilde{r} - \sum_k A_k L_k C_k^{(p \to c)} b'_k \right\|^2}_{e} \quad \text{Equation XIV}$$

where:

j=index for identifying a projector 112;

k=index for identifying projectors 112;

b'$_j$=optimal black offset correction for the jth projector 112;

$\tilde{r}$=target residual profile of image display system 100;

A$_k$=resampling filter of the kth projector 112;

L$_k$=luminance profile of the kth projector 112;

C$_k$=color profile of the kth projector 112;

b'$_k$=candidate optimal black offset correction for the kth projector 112; and e=error term.

Sub-frame generator 108 determines the optimal black offset corrections by minimizing the error term in Equation XIV. In one embodiment, sub-frame generator 108 solves for the optimal black offset corrections using an iterative algorithm as shown in Equation XV. In other embodiments, generator 108 solves for the optimal black offset corrections using other suitable techniques.

$$b'^{(n+1)}_j = b'^{(n)}_j + \alpha \sum_c C_j^T L_j A_j^T e \quad \text{Equation XV}$$

where:

j=index for identifying projectors 112;

n=index for identifying iterations;

b'$_j^{(n+1)}$=optimal black offset correction for the jth projector 112 for iteration number n+1;

b'$_j^{(n)}$=optimal black offset correction for the jth projector 112 for iteration number n;

α=smoothing constant;

c=index for identifying a color of projectors 112;

C$_j^T$=transposed color profile of the jth projector 112;

L$_j$=luminance profile of the jth projector 112;

A$_j^T$=transposed resampling filter of the jth projector 112; and e=error term from Equation XIV.

Referring to FIG. 5, sub-frame generator 108 determines a color profile for each projector 112 and target color profile for image display system 100 as indicated in a block 510. Sub-frame generator 108 determines the color profiles and the target color profile as described above with reference to Equations I and II.

As described above with reference to FIG. 4, target image 406 may be formed according to Equation II. By substituting $$\sum_k A_k L_k H'_k X$$

for $\tilde{L}X$ using Equation XII) and substituting $$b + \sum_k A_k L_k C_k b'_k$$

for $\tilde{b}$ (using Equations XIII and XIV) in Equation II, Equation XVI may be derived.

$$\tilde{X} = \tilde{C} \sum_k A_k L_k H'_k X + b + \sum_k A_k L_k C_k b'_k \qquad \text{Equation XVI}$$

where:
  k=index for identifying projectors 112;
  $\tilde{X}$=target image 406;
  $\tilde{C}$=target color profile for image display system 100;
  $A_k$=resampling filter of the kth projector 112;
  $L_k$=luminance profile of the kth projector 112;
  $H'_k$=optimal blend map for the kth projector 112;
  X=image frame 106;
  b=black offset profile for image display system 100;
  $C_k$=color profile of the kth projector 112; and
  $b'_k$=optimal black offset correction for the kth projector 112.

By moving the target color profile, $\tilde{C}$, and adding the color profiles, C, and the inverted color profiles, $C_k^{-1}$, of projectors 112, Equation XVI may be re-written as Equation XVII.

$$\tilde{X} = \sum_k A_k L_k C_k \{C_k^{-1} \tilde{C} H'_k X\} + b + \sum_k A_k L_k C_k b'_k \qquad \text{Equation XVII}$$

where:
  k=index for identifying projectors 112;
  $\tilde{X}$=target image 406;
  $A_k$=resampling filter of the kth projector 112;
  $L_k$=luminance profile of the kth projector 112;
  $C_k$=color profile of the kth projector 112;
  $C_k^{-1}$=inverted color profile for the kth projector 112;
  $\tilde{C}$=target color profile for image display system 100;
  $H'_k$=optimal blend map for the kth projector 112;
  X=image frame 106;
  b=black offset profile for image display system 100;
  $C_k$=color profile of the kth projector 112; and
  $b'_k$=optimal black offset correction for the kth projector 112.

Equation XVII can be re-written as Equation XVIII as follows.

$$\tilde{X} = \sum_k A_k L_k C_k (\{C_k^{-1} \tilde{C} H'_k X\} + b'_k) + b \qquad \text{Equation XVIII}$$

where:
  k=index for identifying projectors 112;
  $\tilde{X}$=target image 406;
  $A_k$=resampling filter of the kth projector 112;
  $L_k$=luminance profile of the kth projector 112;
  $C_k$=color profile of the kth projector 112;
  $C_k^{-1}$=inverted color profile for the kth projector 112;
  $\tilde{C}$=target color profile for image display system 100;
  $H'_k$=optimal blend map for the kth projector 112;
  X=image frame 106;
  b=black offset profile for image display system 100;
  $C_k$=color profile of the kth projector 112; and
  $b'_k$=optimal black offset correction for the kth projector 112.

Simulated image 306, X, (Equation I) has been optimized to approximate target image 406, $\tilde{X}$, (Equation II) subject to the smoothing constraints as described above. By comparing Equation I with Equation XVIII, optimal sub-frames 110, $Y'_k$, for the kth projector 112 are determined to be equal to ($\{C_k^{-1} \tilde{C} H'_k X\} + b'_k$) as shown in Equation XIX.

$$Y'_k = \{C_k^{-1} \tilde{C} H'_k X\} + b'_k \qquad \text{Equation XIX}$$

where:
  k=index for identifying projectors 112;
  $Y'_k$=optimal sub-frame 110 for the kth projector 112;
  $C_k^{-1}$=inverted color profile for the kth projector 112;
  $\tilde{C}$=target color profile for image display system 100;
  $H'_k$=optimal blend map for the kth projector 112;
  X=image frame 106; and
  $b'_k$=optimal black offset correction for the kth projector 112.

Referring to FIG. 5, sub-frame generator 108 generates optimal sub-frames 110 so that simulated image 306 approximates target image 406 with smoothing constraints as indicated in a block 512. Sub-frame generator 108 generates optimal sub-frames 110 using Equation XIX in one embodiment.

Figure 9:
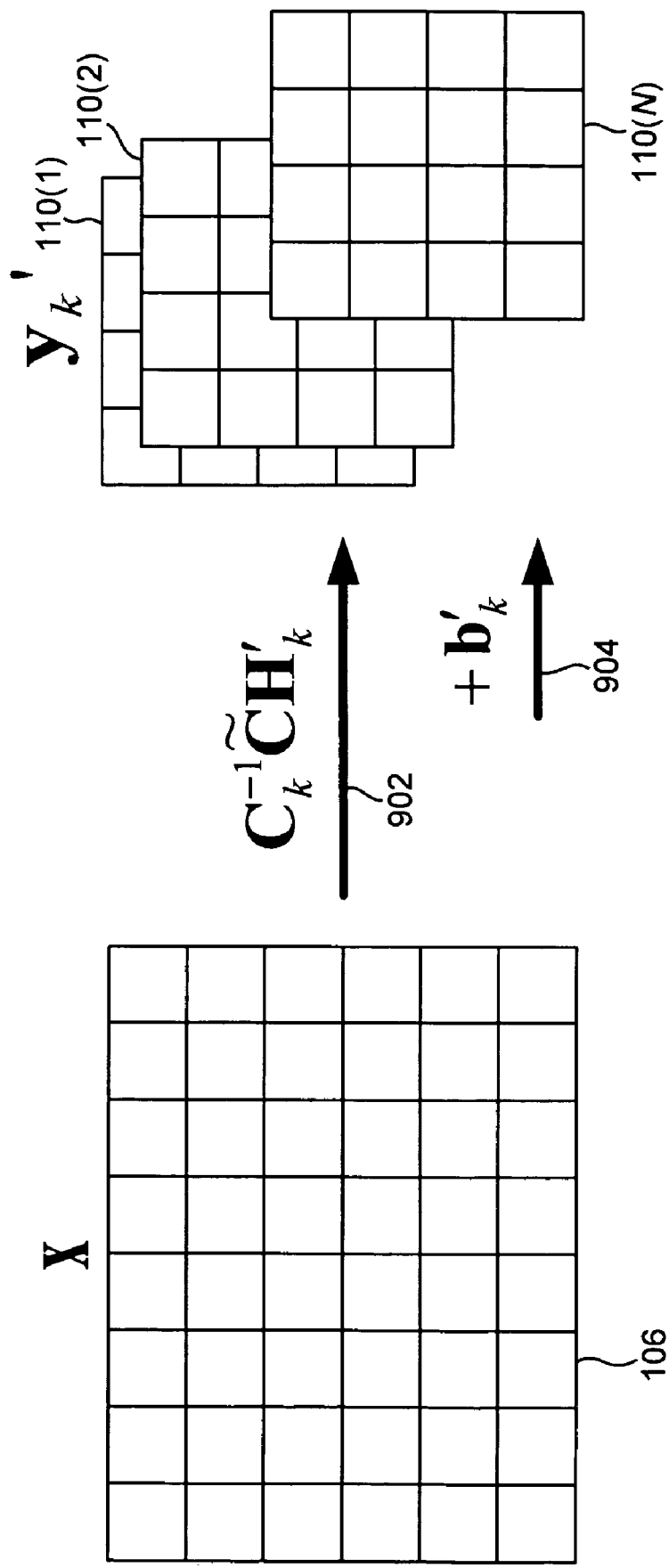
FIG. 9 is a diagram illustrating one embodiment of generating optimal sub-frames.

FIG. 9 is a diagram illustrating one embodiment of generating optimal sub-frames 110 using Equation XIX. For each projector 112, sub-frame generator 108 applies a respective optimal blend map, $H'_k$, the target color profile, $\tilde{C}$, for image display system 100, and a respective inverted color profile, $C_k^{-1}$, to image frame 106 (X) as indicated by an arrow 902. Sub-frame generator 108 then adds the respective optimal black offset correction, $b'_k$, for each projector 112, as indicated by an arrow 904, to produce respective optimal sub-frames 110, $Y'_k$. Sub-frame generator 108 provides optimal sub-frames 110, $Y'_k$, to projectors 112 to form displayed image 114 on display surface 116 as described above.

In other embodiments, the optimal blend map, the inverted color profile, and the target color profile in Equation XIX may be combined into a single operator for each projector 112. In further embodiments, the optimal blend map, the inverted color profile, the target color profile, and/or the optimal black offset correction in Equation XIX may be each separated into two or more operators using the Equations described above.

In another embodiment, sub-frame generator 108 performs the process of generating optimal sub-frames 110, $Y'_k$, for each image frame 106 by iteratively forming a simulated image 306 from sub-frames 110, comparing the simulated image 306 to target image 406 to determine an error subject to the smoothing constraints described above in Equation X, and adjusting the pixel values of sub-frames 110 using the error until sub-frames 110 form a simulated image 306 that approximates target image 406.

With the above embodiments, optimal sub-frames 110 may be generated for image display system 100 to allow for any arbitrary combination of tiled and superimposed images on display surface 116. In addition, the above embodiments model pixel shapes and sizes explicitly to support arbitrary scaling between a resolution of image frame 106 and sub-frames 110. Further, the above embodiments model intra and inter-projector color and luminance variations to support overlapping display of images from different projectors 112 to achieve desirable characteristics.

One embodiment provides an image display system 100 with multiple overlapped low-resolution projectors 112 coupled with an efficient real-time (e.g., video rates) image processing algorithm for generating sub-frames 110. In one embodiment, multiple low-resolution, low-cost projectors 112 are used to produce high resolution images at high lumen levels, but at lower cost than existing high-resolution projection systems, such as a single, high-resolution, high-output projector. One embodiment provides a scalable image display system 100 that can provide virtually any desired resolution, brightness, and color, by adding any desired number of component projectors 112 to the system 100.

In some existing display systems, multiple low-resolution images are displayed with temporal and sub-pixel spatial offsets to enhance resolution. There are some important differences between these existing systems and embodiments described herein. For example, in one embodiment, there is no need for circuitry to offset the projected sub-frames 110 temporally. In one embodiment, sub-frames 110 from the component projectors 112 are projected "in-sync". As another example, unlike some existing systems where all of the sub-frames go through the same optics and the shifts between sub-frames are all simple translational shifts, in one embodiment, sub-frames 110 are projected through the different optics of the multiple individual projectors 112. In one embodiment, the signal processing model that is used to generate optimal sub-frames 110 takes into account relative geometric distortion among the component sub-frames 110, and is robust to minor calibration errors and noise.

It can be difficult to accurately align projectors into a desired configuration. In one embodiment, regardless of what the particular projector configuration is, even if it is not an optimal alignment, sub-frame generator 108 determines and generates optimal sub-frames 110 for that particular configuration.

Algorithms that seek to enhance resolution by offsetting multiple projection elements have been previously proposed. These methods may assume simple shift offsets between projectors, use frequency domain analyses, and rely on heuristic methods to compute component sub-frames. In contrast, one form of the embodiments described herein utilize an optimal real-time sub-frame generation algorithm that explicitly accounts for arbitrary relative geometric distortion (not limited to homographies) between the component projectors 112, including distortions that occur due to a display surface that is non-planar or has surface non-uniformities. One embodiment generates sub-frames 110 based on a geometric relationship between a hypothetical high-resolution hypothetical reference projector at any arbitrary location and each of the actual low-resolution projectors 112, which may also be positioned at any arbitrary location.

In one embodiment, image display system 100 is configured to project images that have a three-dimensional (3D) appearance. In 3D image display systems, two images, each with a different polarization, are simultaneously projected by two different projectors. One image corresponds to the left eye, and the other image corresponds to the right eye. Conventional 3D image display systems typically suffer from a lack of brightness. In contrast, with one embodiment, a first plurality of projectors 112 may be used to produce any desired brightness for the first image (e.g., left eye image), and a second plurality of projectors 112 may be used to produce any desired brightness for the second image (e.g., right eye image). In another embodiment, image display system 100 may be combined or used with other display systems or display techniques, such as tiled displays. For example, for a displayed image 114 with a plurality of tiles, each tile in the displayed image 114 could be produced by a different plurality of overlapping projectors 112, such as a first set of three projectors 112 for producing overlapping sub-frames for a first tile, a second set of three projectors 112 for producing overlapping sub-frames for a second tile, and so on.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An image display system comprising:
a sub-frame generator configured to generate first and second sub-frames corresponding to an image frame using first and second optimal sub-pixel blending maps that are derived by forming a simulated image to approximate a target image subject to at least one smoothing constraint between the simulated image and the target image; and
first and second display devices configured to simultaneously display the first and the second sub-frames onto a display surface in at least partially overlapping positions;
wherein the sub-frame generator is configured to generate the first and the second sub-frames using first and second optimal black offset corrections of the first and the second display devices, respectively.

2. The image display system of claim 1 wherein the optimal sub-pixel blending maps are derived using first and second pixel characteristics of the first and the second display devices, respectively.

3. The image display system of claim 1 wherein the optimal sub-pixel blending maps are derived using first and second pixel characteristics of the first and the second display devices, respectively, first and second geometric mappings between the first and the second display devices, respectively, and a reference coordinate system, and optimal luminance corrections for the first and the second display devices, respectively.

4. The image display system of claim 1 wherein the sub-frame generator is configured to generate the first and the second sub-frames using a target color profile of the image display system and first and second inverted color profiles of the first and the second display devices, respectively.

5. The image display system of claim 1 wherein the first and the second sub-frames form first and second tiled images on the display surface.

6. The image display system of claim 1 wherein the first and the second sub-frames form a superimposed image on the display surface.

7. A method performed by an image display system, the method comprising:

accessing an image frame; and generating first and second sub-frames from the image frame for simultaneous display by first and second display devices, respectively, in at least partially overlapping positions on a display surface so that a simulated image formed from the first and the second sub-frames approximates, subject to at least one smoothing constraint, a target image formed from the image frame and a target color profile of the image display system that is determined from first and second measured color profiles of the first and the second display devices, respectively.

8. The method of claim 7 further comprising:

forming the first sub-frame using a first reconstruction filter that specifies at least a first pixel characteristic of the first sub-frame, and forming the second sub-frame using a second reconstruction filter that specifies at least a second pixel characteristic of the second sub-frame.

9. The method of claim 7 further comprising:

forming the simulated image using a reconstruction filter that specifies a pixel characteristic of the simulated image.

10. The method of claim 7 further comprising:

determining a first set of coefficients from a reconstruction filter and a geometric mapping between a first display device configured to display the first sub-frame and a reference coordinate system;

wherein the first set of coefficients specify a plurality of weightings corresponding to a plurality of pixel locations in the image frame for each pixel location in the first sub-frame.

11. The method of claim 7 further comprising:

determining the target color profile of the image display system by determining an intersection gamut of the first and the second measured color profiles.

12. The method of claim 7 wherein the at least one smoothing constraint specifies a relationship between a target luminance profile and a simulated luminance image.

13. The method of claim 7 further comprising:

simultaneously displaying the first and the second sub-frames with the first and the second display devices, respectively, in the at least partially overlapping positions on the display surface.

14. The method of claim 7 wherein the first and the second sub-frames form first and second tiled images on the display surface.

15. The method of claim 7 wherein the first and the second sub-frames form a superimposed image on the display surface.

16. A program product comprising:

a program executable by a processing system for causing the processing system to:

access an image frame; and generate first and second sub-frames from the image frame for simultaneous display by first and second display devices, respectively, in at least partially overlapping positions on a display surface so that a simulated luminance image formed from the first and the second sub-frames approximates a target luminance profile formed from the image frame and the luminance of each of the first and the second display devices with at least one smoothing constraint applied to a relationship between the simulated luminance image and the target luminance profile; and a medium for storing the program.

17. The program product of claim 16 wherein the smoothing constraint is a minimization of a difference between the gradient of the target luminance profile and gradient of the simulated luminance image.

18. The program product of claim 16 wherein the smoothing constraint is minimization of the gradient of an optimal luminance correction generated with reference to the target luminance profile.

19. The program product of claim 16 wherein the program is executable by the processing system for causing the processing system to:

form the first sub-frame using a first reconstruction filter that specifies at least a first pixel characteristic of the first sub-frame, and forming the second sub-frame using a second reconstruction filter that specifies at least a second pixel characteristic of the second sub-frame.

* * * * *